US007826103B2

(12) United States Patent
Kayama

(10) Patent No.: US 7,826,103 B2
(45) Date of Patent: Nov. 2, 2010

(54) PRINTING SYSTEM, INFORMATION PROCESSING APPARATUS, PRINTING APPARATUS, CONTROL METHODS THEREOF, AND PROGRAM

(75) Inventor: Hiroyuki Kayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1082 days.

(21) Appl. No.: 11/488,777

(22) Filed: Jul. 19, 2006

(65) Prior Publication Data
US 2007/0024901 A1 Feb. 1, 2007

(30) Foreign Application Priority Data
Jul. 28, 2005 (JP) .............................. 2005-219440

(51) Int. Cl.
G06F 15/00 (2006.01)
G06F 3/12 (2006.01)
G06K 1/00 (2006.01)
H04N 1/387 (2006.01)
H04N 1/00 (2006.01)

(52) U.S. Cl. ..................... 358/452; 358/1.13; 358/1.15; 358/1.18; 358/1.9

(58) Field of Classification Search ................ 358/1.13, 358/1.15, 439, 1.17, 403, 452, 434, 1.16; 399/81; 707/1, 10; 709/201, 203
See application file for complete search history.

(56) References Cited

U.S. PATENT DOCUMENTS

| 7,722,270 | B2 * | 5/2010 | Yoshida ....................... 400/620 |
| 2004/0017476 | A1 | 1/2004 | Nagashima et al. |
| 2004/0156069 | A1 | 8/2004 | Kurotsu et al. |
| 2004/0160613 | A1 | 8/2004 | Kurotsu et al. |
| 2005/0111039 | A1 * | 5/2005 | Yoshida ..................... 358/1.16 |

FOREIGN PATENT DOCUMENTS

| JP | 04358870 A | * | 12/1992 |
| JP | 2001301286 A | | 10/2001 |
| JP | 2001344309 A | | 12/2001 |
| JP | 200458438 | | 2/2004 |
| JP | 2004090364 A | | 3/2004 |
| JP | 2005161592 A | | 6/2005 |
| JP | 2005219440 | | 8/2005 |

OTHER PUBLICATIONS

Japanese Office Action dated Jun. 28, 2010 in corresponding Japanese Application No. 2005-219440.

* cited by examiner

*Primary Examiner*—Twyler L Haskins
*Assistant Examiner*—Myles D Robinson
(74) *Attorney, Agent, or Firm*—Fitzpatrick, Cella, Harper & Scinto

(57) ABSTRACT

An information processing apparatus transmits job data to be printed to a printing apparatus, and modifies the print data stored in storage means in accordance with a modification notification from the printing apparatus to transmit the modified job data to the printing apparatus. The printing apparatus stores job data to execute printing process. The printing apparatus determines whether or not modified and set print property items include items which can be modified by the information processing apparatus. The printing apparatus transmits a modification notification that requests to modify the job data based on the modified and set print property items to the information processing apparatus based on the determination result. The printing apparatus receives the modified job data corresponding to the modification notification from the information processing apparatus.

15 Claims, 16 Drawing Sheets

F I G. 5
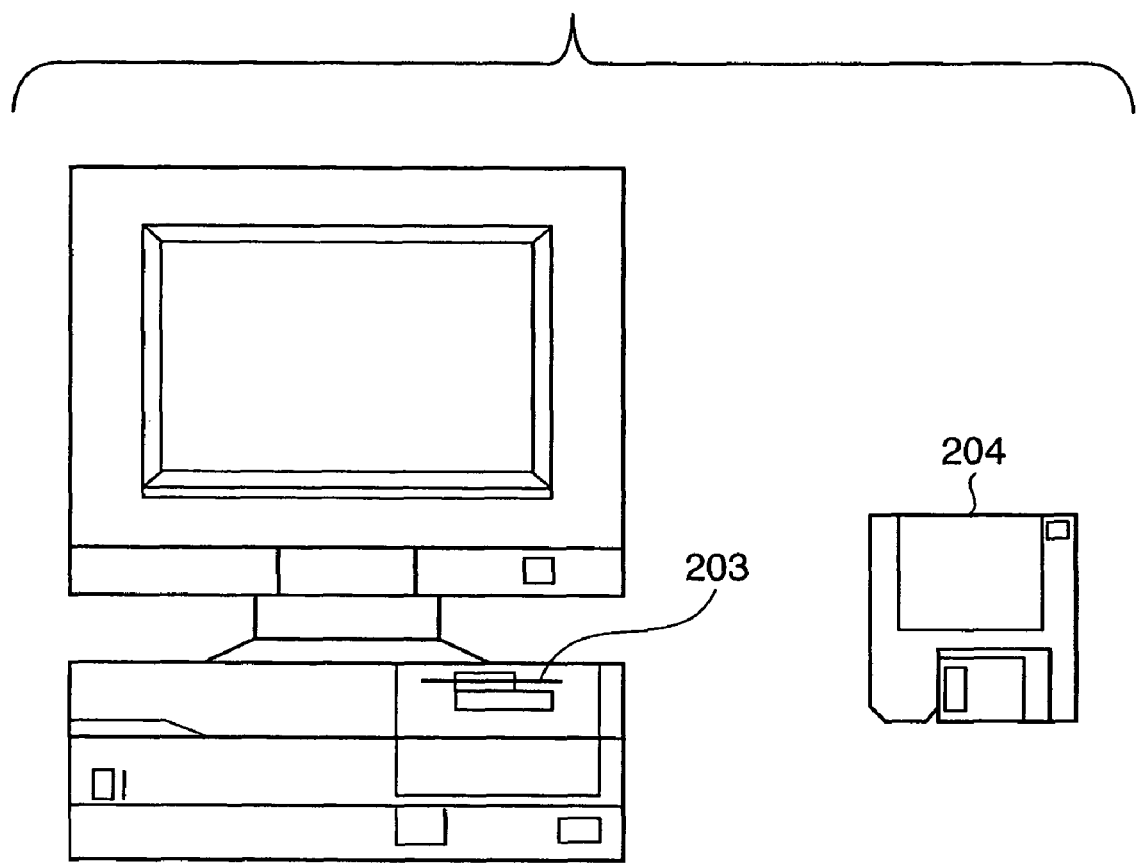

F I G. 6B

```
┌─────────────────────────────────────────────────────┐ ~1200
│ PRINT                                               │
├─────────────────────────────────────────────────────┤
│                    1201a            1201b           │
│      PRINT DATA : [Document 001]   [BROWSE]         │
│                                                     │
│        PRINTER : [PRINTER A      ▼] ~1202           │
│                                                     │
│  OUTPUT METHOD : [TRIAL PRINT    ▼] ~1203           │
│                                                     │
│         COPIES : [ 1 ] ~1204                        │
│                                                     │
│  PRINT RANGE                                        │
│    ⦿ ALL                                            │
│    ○ DESIGNATE PAGES : [         ]  } 1205          │
│                                                     │
│    PAGE LAYOUT : [2 PAGES/SHEET  ▼] ~1206           │
│  IMAGE ROTATION : [180° ROTATION ▼] ~1207           │
│                                                     │
│           [ PRINT EXECUTION ]   [ CANCEL ]          │
└─────────────────────────────────────────────────────┘
                    1208              1209
```

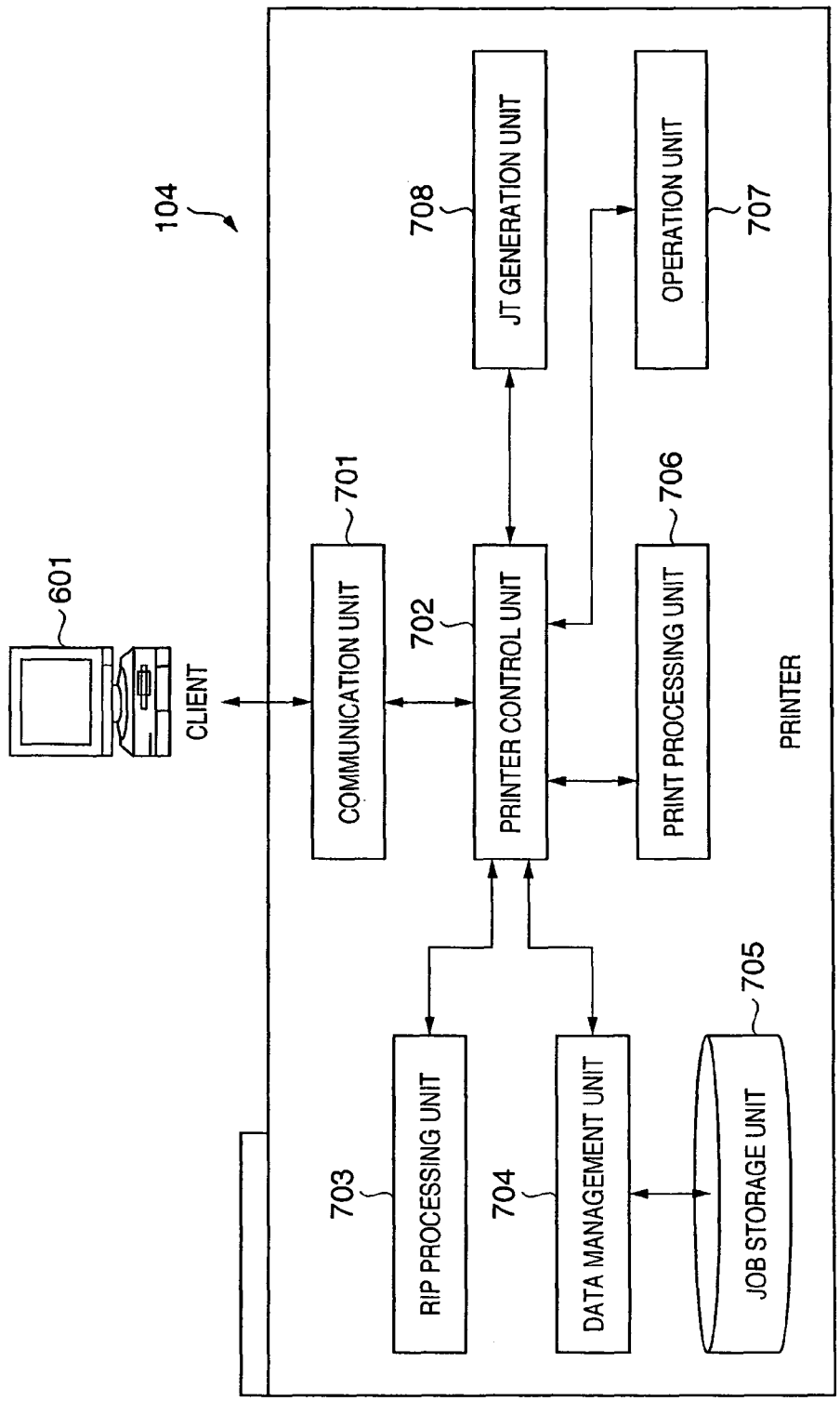

PRINTING SYSTEM, INFORMATION PROCESSING APPARATUS, PRINTING APPARATUS, CONTROL METHODS THEREOF, AND PROGRAM

BACKGROUND OF THE INVENTION

1. Field of the Invention

The present invention relates to a printing system which comprises an information processing apparatus and a printing apparatus connected to the information processing apparatus, and controls the printing apparatus to print job data transferred from the information processing apparatus, an information processing apparatus, a printing apparatus, control methods thereof, and a program.

2. Description of the Related Art

Conventionally, a POD (Print On Demand) system which receives orders of creation requests of prints (magazines, newspapers, brochures, advertisements, and the like) from customers, and generates prints based on digital data using a printing apparatus such as a digital multi-functional peripheral and the like has been developed. In the workflow of this POD system, an operator executes a prepress job for generating print data on a client computer, and executes a press job for performing print processing in front of a printing apparatus.

In such workflow, photo original data before RIP processing in an image forming apparatus is held after proofing. When color reproduction of a specific photo is inappropriate, a re-print function in which parameters of conversion processing from an RGB color system into a CMYK system and correction processing are set at the image forming apparatus, and image conversion processing and RIP processing are redone is considered. With this re-print function, appropriate print data can be obtained without modifying entire layout data while tracking back to a layout data generation apparatus (for example, Japanese Patent Laid-Open No. 2004-058438).

In the above prior art, the operator often wants to execute actual print processing after he or she modifies (adjusts) print settings (e.g., an image layout, color appearances for respective objects, and the like) depending on the print result of the first print processing. Note that the processing performance of the client computer is often different from that of the printing apparatus. For examples as described in Japanese Patent Laid-Open No. 2004-058438, the color appearance of the entire data can be adjusted on the printing apparatus side, but the color appearances for respective object and the image layout cannot be adjusted by the printing apparatus.

In the print workflow, since the operator judges the contents by observing proofed prints, he or she does works on the printing apparatus side after inputting a print instruction. For this reason, when the adjustment contents are those which can only be done on the client computer, the operator must go to the client computer to execute the adjustment job, thus imposing a heavy load. Also, the work efficiency of the adjustment job is poor.

SUMMARY OF THE INVENTION

The present invention has been made to solve the aforementioned problems. The present invention has as its object to provide a printing system which can efficiently execute an adjustment job when print settings of already printed print data are adjusted to re-print that print data, an information processing apparatus, a printing apparatus, control methods thereof, and a program.

According to the present invention, the foregoing A object is attained by providing a printing system which comprises an information processing apparatus and a printing apparatus connected to the information processing apparatus, and controls the printing apparatus to print job data transferred from the information processing apparatus, comprising:

the information processing apparatus comprises:

first storage means for storing print data and print control information;

job data transmission means for transmitting the job data to be printed, which is generated based on the print data and the print control information, to the printing apparatus;

first modification means for modifying the print data stored in the first storage means in accordance with a modification notification from the printing apparatus to generate modified job data; and modified job data transmission means for transmitting the modified job data modified by the first modification means to the printing apparatus, and the printing apparatus comprises:

second storage means for storing job data;

control means for storing job data received from the information processing apparatus in the second storage means, and executing print processing of the job data;

print property setting means for setting print properties for the job data stored in the second storage means;

determination means for determining whether or not print property items modified and set by the print property setting means include items which cannot be modified by the printing apparatus but can be modified by the information processing apparatus;

notification means for transmitting a modification notification that requests to modify the job data based on the modified and set print property items to the information processing apparatus based on the determination result of the determination means; and reception means for receiving the modified job data corresponding to the modification notification from the information processing apparatus.

According to the present invention, the foregoing object is attained by providing an information processing apparatus for generating job data to be printed by a printing apparatus, comprising:

storage means for storing print data and print control information;

job data transmission means for transmitting the job data to be printed, which includes the print data and the print control information, to the printing apparatus;

modification means for modifying the print data stored in the storage means in accordance with a modification notification from the printing apparatus to generate modified job data; and modified job data transmission means for transmitting the modified job data modified by the modification means to the printing apparatus.

In a preferred embodiment, the storage means stores print data and print control information before page-layout processing, and the modification means generates modified job data by applying page-layout processing to the print data stored in the storage means in accordance with print control information included in a modification notification from the printing apparatus.

In a preferred embodiment, the apparatus further comprises:

print setting means for making print settings including an output method of the job data, and in that the storage means stores the job data when a predetermined print mode is designated by the print setting means, and the job data transmission means transmits a command indicating the predetermined print mode to the printing apparatus together with the job data so as to make the printing apparatus save the job data after printing.

In a preferred embodiment, the modified job data transmission means transmits a predetermined command to the printing apparatus together with the modified job data modified by the modification means so as to replace the job data before modification saved in the printing apparatus by the modified job data.

According to the present invention, the foregoing object is attained by providing a printing apparatus for printing job data generated by an information processing apparatus, comprising:

storage means for storing job data;

control means for storing job data received from the information processing apparatus in the-storage means, and executing print processing of the job data;

print property setting means for setting print properties for the job data stored in the storage means;

determination means for determining whether or not print property items modified and set by the print property setting means include items which cannot be modified by the printing apparatus but can be modified by the information processing apparatus;

notification means for transmitting a modification notification that requests to modify the job data based on the modified and set print property items to the information processing apparatus based on the determination result of the determination means; and reception means for receiving the modified job data corresponding to the modification notification from the information processing apparatus.

In a preferred embodiment, when the determination means determines that the print property items modified and set by the print property setting means include items which cannot be modified by the printing apparatus but can be modified by the information processing apparatus, the notification means transmits the modification notification that requests to modify the job data based on the modified and set print property items to the information processing apparatus, and the control means executes the print processing of the modified job data received by the reception means.

In a preferred embodiment, the apparatus further comprises:

modification means for, when the determination means determines that the modified and set print property items do not include any items which cannot be modified by the printing apparatus but can be modified by the information processing apparatus, modifying the job data based on the modified and set print property items, and in that the control means executes the print processing of the modified job data modified by the modification means.

In a preferred embodiment, when the reception means receives a command indicating the predetermined print mode together with the job data, the control means stores that job data in the storage means even after the print processing since the job data is likely to be modified and re-printed.

In a preferred embodiment, when the reception means receives a predetermined command together with the modified job data, the control means replaces the job data before modification stored in the storage means by the modified job data.

In a preferred embodiment, the print property setting means generates a print property setting window which allows to set a print property pattern that specifies a combination of a plurality of print property items.

According to the present invention, the foregoing object is attained by providing a method of controlling an information processing apparatus for generating job data to be printed by a printing apparatus, comprising:

a storage step of storing print data and print control information in a storage medium;

a job data transmission step of transmitting the job data to be printed, which includes the print data and the print control information, to the printing apparatus;

a modification step of modifying the print data stored in the storage medium in accordance with a modification notification from the printing apparatus to generate modified job data; and a modified job data transmission step of transmitting the modified job data modified in the modification step to the printing apparatus.

According to the present invention, the foregoing object is attained by providing a method of controlling a printing apparatus for printing job data generated by an information processing apparatus, comprising:

a storage step of storing job data in a storage medium;

a control step of storing job data received from the information processing apparatus in the storage medium, and executing print processing of the job data;

a print property setting step of setting print properties for the job data stored in the storage medium;

a determination step of determining whether or not print property items modified and set in the print property setting step include items which cannot be modified by the printing apparatus but can be modified by the information processing apparatus;

a notification step of transmitting a modification notification that requests to modify the job data based on the modified and set print property items to the information processing apparatus based on the determination result in the determination step; and a reception step of receiving the modified job data corresponding to the modification notification from the information processing apparatus.

According to the present invention, the foregoing object is attained by providing a program for making a computer control an information processing apparatus for generating job data to be printed by a printing apparatus, the program characterized by making the computer execute:

a storage step of storing print data and print control information in a storage medium;

a job data transmission step of transmitting the job data to be printed, which includes the print data and the print control information, to the printing apparatus;

a modification step of modifying the print data stored in the storage medium in accordance with a modification notification from the printing apparatus to generate modified job data; and a modified job data transmission step of transmitting the modified job data modified in the modification step to the printing apparatus.

According to the present invention, the foregoing object is attained by providing a program for making a computer control a printing apparatus for printing job data generated by an information processing apparatus, the program characterized by making the computer execute:

a storage step of storing job data in a storage medium;

a control step of storing job data received from the information processing apparatus in the storage medium, and executing print processing of the job data;

a print property setting step of setting print properties for the job data stored in the storage medium;

a determination step of determining whether or not print property items modified and set in the print property setting step include items which cannot be modified by the printing apparatus but can be modified by the information processing apparatus;

a notification step of transmitting a modification notification that requests to modify the job data based on the modified and set print property items to the information processing apparatus based on the determination result in the determination step; and a reception step of receiving the modified job data corresponding to the modification notification from the information processing apparatus.

According to the present invention, there are provided a printing system which can efficiency execute an adjustment job when print settings of already printed print data are adjusted to re-print that print data, an information processing apparatus, a printing apparatus, control methods thereof, and a program.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view showing the relationship with an FD to be inserted into an FD drive according to the first embodiment of the present invention;

FIG. 6B is a view showing an example of a print setting window displayed by the client computer according to the first embodiment of the present invention;

FIG. 7A is a block diagram showing the functional arrangement of a printer according to the first embodiment of the present invention;

DESCRIPTION OF THE EMBODIMENTS

Preferred embodiments of the present invention will be described in detail in accordance with the accompanying drawings.

First Embodiment

<Example of Arrangement of Printing System>

Figure 1:
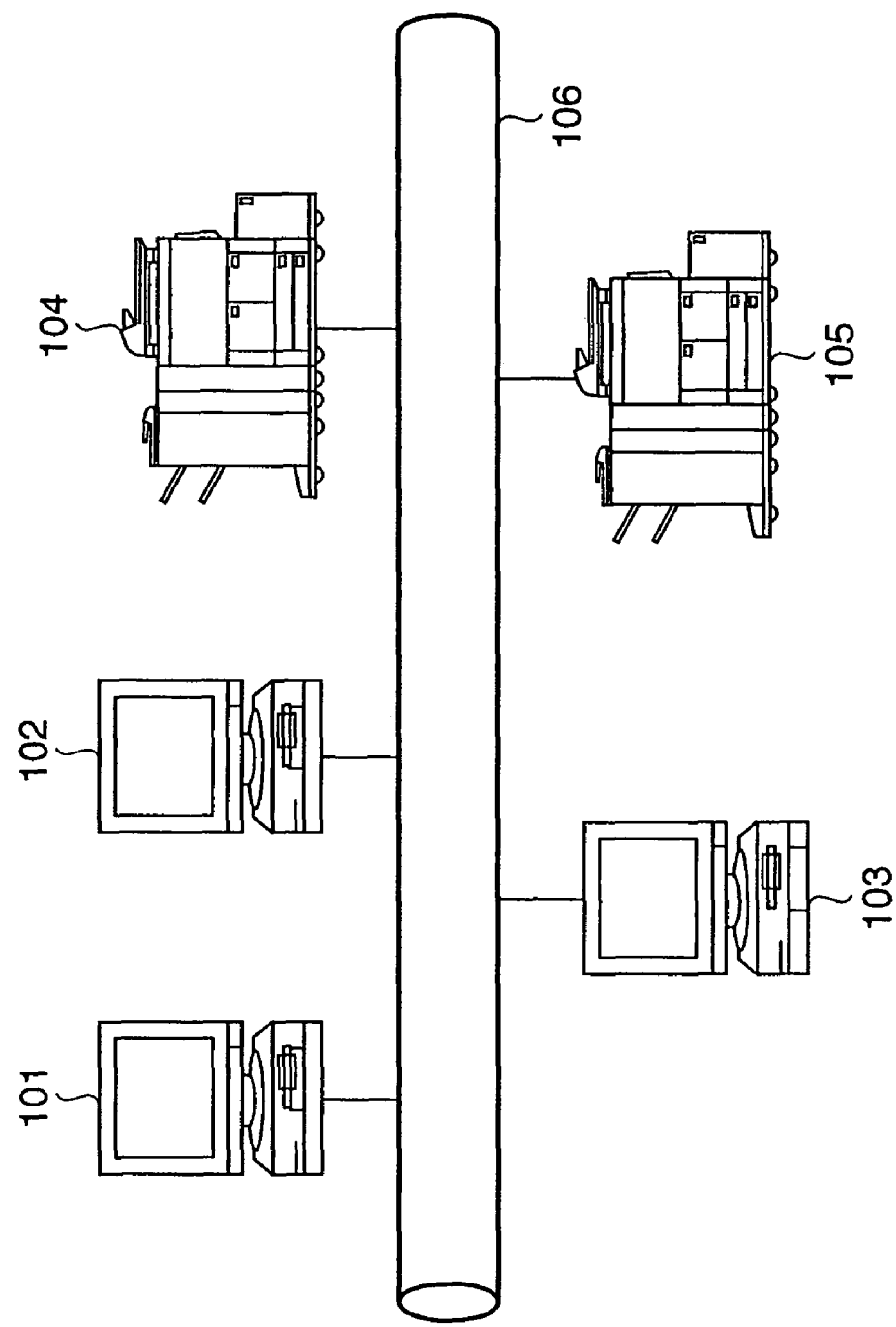
FIG. 1 is a diagram showing the overall arrangement of a printing system according to the first embodiment of the present invention.

FIG. 1 shows the overall arrangement of a printing system according to the first embodiment of the present invention.

Note that an environment of the entire printing system in the following description is adopted for the purpose of easy understanding of the description of the present invention, and the present invention is not limited to such specific environment.

Referring to FIG. 1, reference numerals 101, 102, and 103 denote network computers (client computers) which are connected to a network 106 and can communicate with each other. These client computers are typically personal computers (PCs). These client computers 101 to 103 are connected to the network 106 via network cables such as Ethernet® or the like. Furthermore, these client computers 101 to 103 can execute various programs such as application programs and the like, and have a transfer function of transferring print data to network printers 104 and 105 via the network 106.

Reference numerals 104 and 105 denote network printers as print control apparatuses. These network printers 104 and 105 are connected to the network 106 via network interfaces (not shown). The network printers 104 and 105 interpret print jobs which are received from the client computers 101 to 103 and include print data. The network printers 104 and 105 convert the print jobs into dot images for respective pages based on the interpretation results, and print them.

Note that the network printers 104 and 105 may have different processing functions.

Reference numeral 106 denotes a network which interconnects various devices such as the client computers 101 to 103, the network printers 104 and 105, and the like.

The network 106 typically includes any of the Internet, a LAN, WAN, and telephone line, a dedicated digital line, an ATM and frame relay line, a communication satellite line, a cable television line, a data broadcast wireless line, and the like. Alternatively, the network 106 may be so-called a communication network implemented by a combination of them, and may allow data exchange.

<Hardware Arrangement Example of Client Computer>

Figure 2:
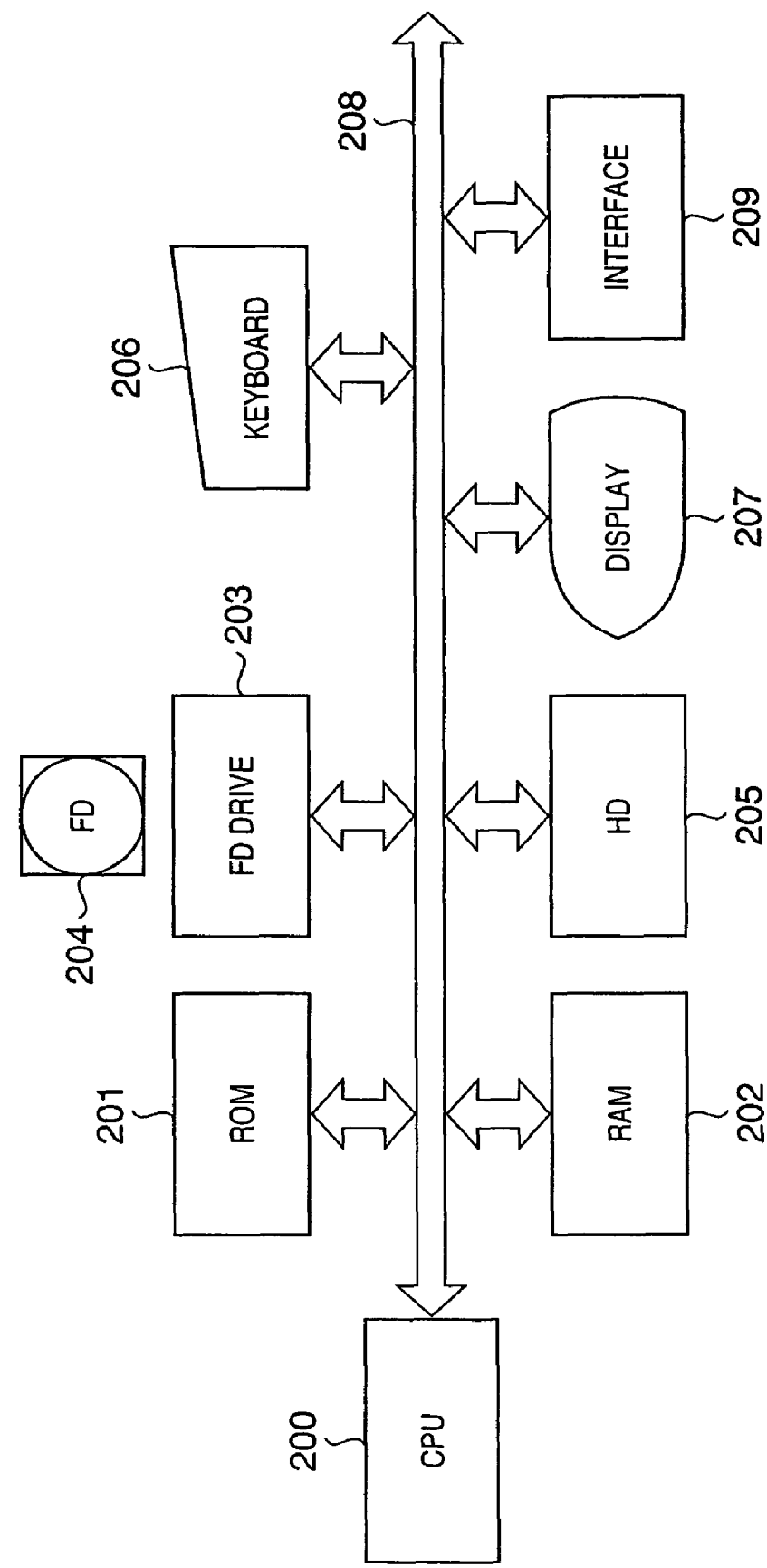
FIG. 2 is a block diagram showing the detailed arrangement of a client computer according to the first embodiment of the present invention.

FIG. 2 is a block diagram showing the detailed arrangement of the client computer according to the first embodiment of the present invention.

Note that FIG. 2 shows the detailed arrangement of each of the client computers 101 to 103.

Referring to FIG. 2, reference numeral 200 denotes a CPU which controls the overall apparatus. The CPU 200 executes various programs such as application programs, printer driver programs, an OS, a control program of this embodiment, and the like, which are stored in a hard disk (HD) 205. The CPU 200 controls to temporarily store data such as information, files, and the like required to execute programs in a RAM 202.

Reference numeral 201 denotes a ROM as storage means. The ROM 201 stores programs such as a basic I/O program and the like, and various data such as font data, template data, and the like used upon document processing. Reference numeral 202 denotes a RAM as temporary storage means. The RAM 202 serves as storage areas such as a main memory, work area, and the like of the CPU 200.

Reference numeral 203 denotes an FD—(floppy®) disk) drive as storage medium reading means. This FD drive 203 can load data such as programs and the like stored in an FD 204 onto this computer, as will be described later using FIG. 5. Reference numeral 204 denotes an FD as a storage medium. This FD 204 is a storage medium which stores computer readable programs.

Note that the storage medium is not limited to the FD 204, and arbitrary storage media such as a CD-ROM, CD-R/RW, PC card, DVD, IC memory card, MO, memory stick, and the like can be used.

Reference numeral 205 denotes a hard disk (HD) which is one of external storage means, and serves as a large-capacity memory. This HD 205 stores programs such as application programs, printer driver programs, an OS, a control program, related programs, and the like.

Reference numeral 206 denotes a keyboard as instruction input means. This keyboard 206 is used when the user inputs commands and the like including device control commands to the client computer or the operator or administrator inputs such commands to a print server or network printer. In addition to the keyboard 206, a pointing device such as a mouse or the like may be connected. Reference numeral 207 denotes a display as display means, which comprises a CRT, liquid crystal display, or the like. The display 207 displays various kinds of information such as commands input from the keyboard 206, printer status, and the like.

Reference numeral 208 denotes a system bus which interconnects various building components of the client computer and serves as a transfer path of data exchanged among these building components.

Reference numeral 209 denotes an interface as input/output means. The client computer as the information processing apparatus exchanges data with external apparatuses (e.g., the network printer 104 as the printing apparatus and the like) via this interface 209. As examples of the interface 209, various interfaces such as a USB interface, IEEE1394 interface, wireless LAN interface, network interface, and the like are available. The network printers 104 and 105 incorporate the same type of interfaces.

Note that the building components of this client computers are merely examples, and the present invention is not limited to the illustrated arrangement example. For example, the storage destinations of data and programs may be changed to the ROM, RAM, or HD according to their features.

The memory map on the RAM 202 of the client computer will be described below using FIG. 3.

Figure 3:
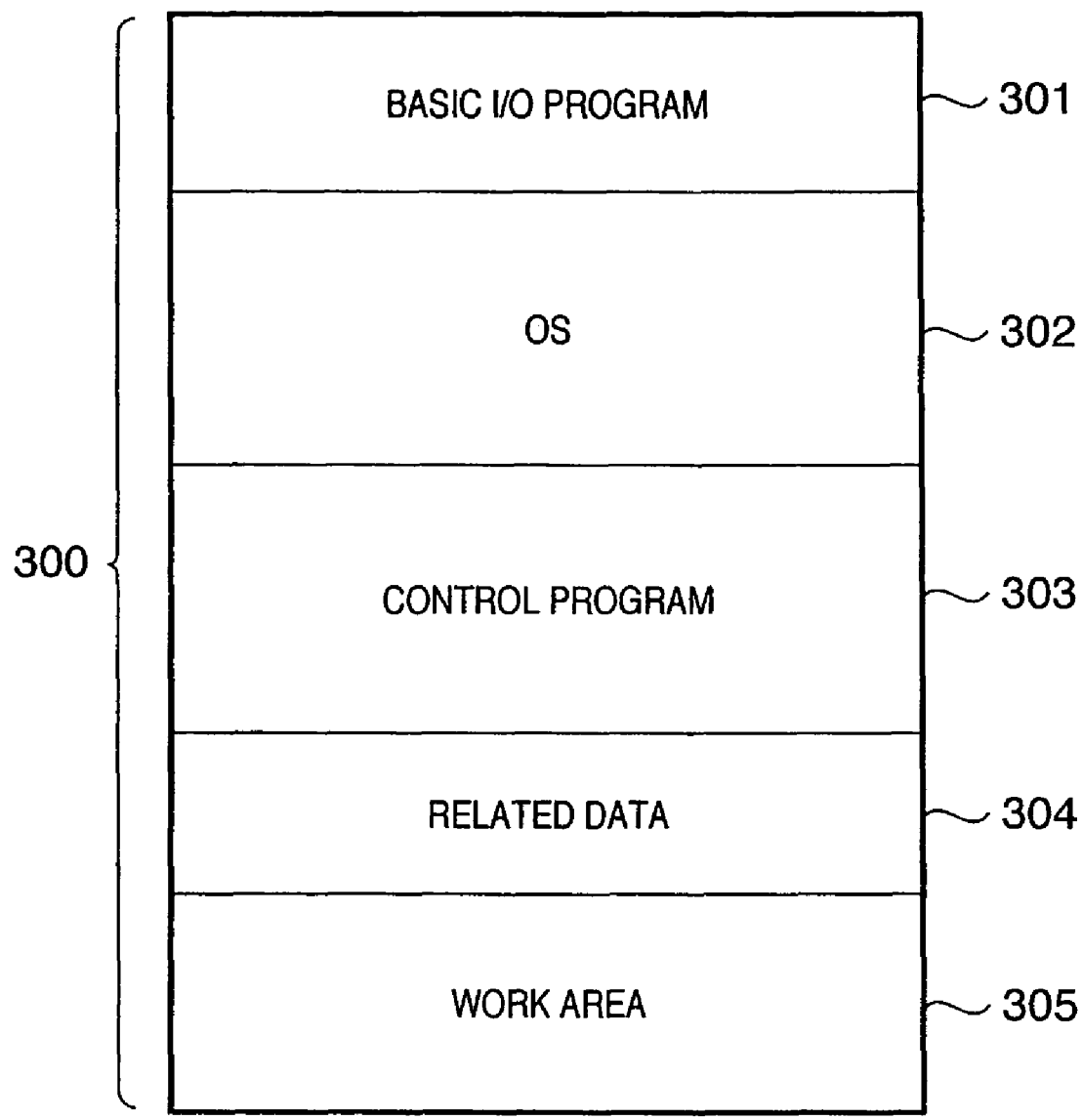
FIG. 3 is a view showing an example of the memory map on a RAM of the client computer according to the first embodiment of the present invention.

FIG. 3 shows an example of the memory map on the RAM of the client computer according to the first embodiment of the present invention.

Especially, FIG. 3 shows a memory map 300 in a state wherein a control program in the client computer of the present invention which is to be loaded from the FD 204 is loaded onto the RAM 202, and it becomes ready to run.

In the example of the first embodiment, the control program and related data are directly loaded from the FD 204 onto the RAM 202 upon execution. However, the present invention is not limited to this. For example, every time the control program is to be launched, it may be loaded from the HD 205, in which the control program has already been installed from the FD 204, onto the RAM 202.

The storage medium that stores the control program of this embodiment may be other storage media such as a CD-ROM, CD-R, PC card, DVD, IC memory card, and the like in addition to the FD. Furthermore, the control program of this embodiment may be stored in the ROM 201 to form a part of the memory map, and may be directly executed by the CPU 200. Also, software which implements functions equivalent to those of the aforementioned devices may be used as alternatives to hardware devices.

Reference numeral 301 denotes an area which stores a basic I/O program. This basic I/O program has an IPL (initial program loading) function of loading the OS from the HD 205 onto the RAM 202 and starting the operation of the OS when the power switch of the computer is turned on. Reference numeral 302 denotes an area for storing the operating system (OS). Reference numeral 303 denotes an area for storing the control program. Reference numeral 304 denotes an area for storing related data such as various parameters and the like used by various programs including the control program and the like. Reference numeral 305 denotes a work area where the CPU 200 executes the control program of this embodiment.

The memory map on the FD 204 will be described below using FIG. 4.

Figure 4:
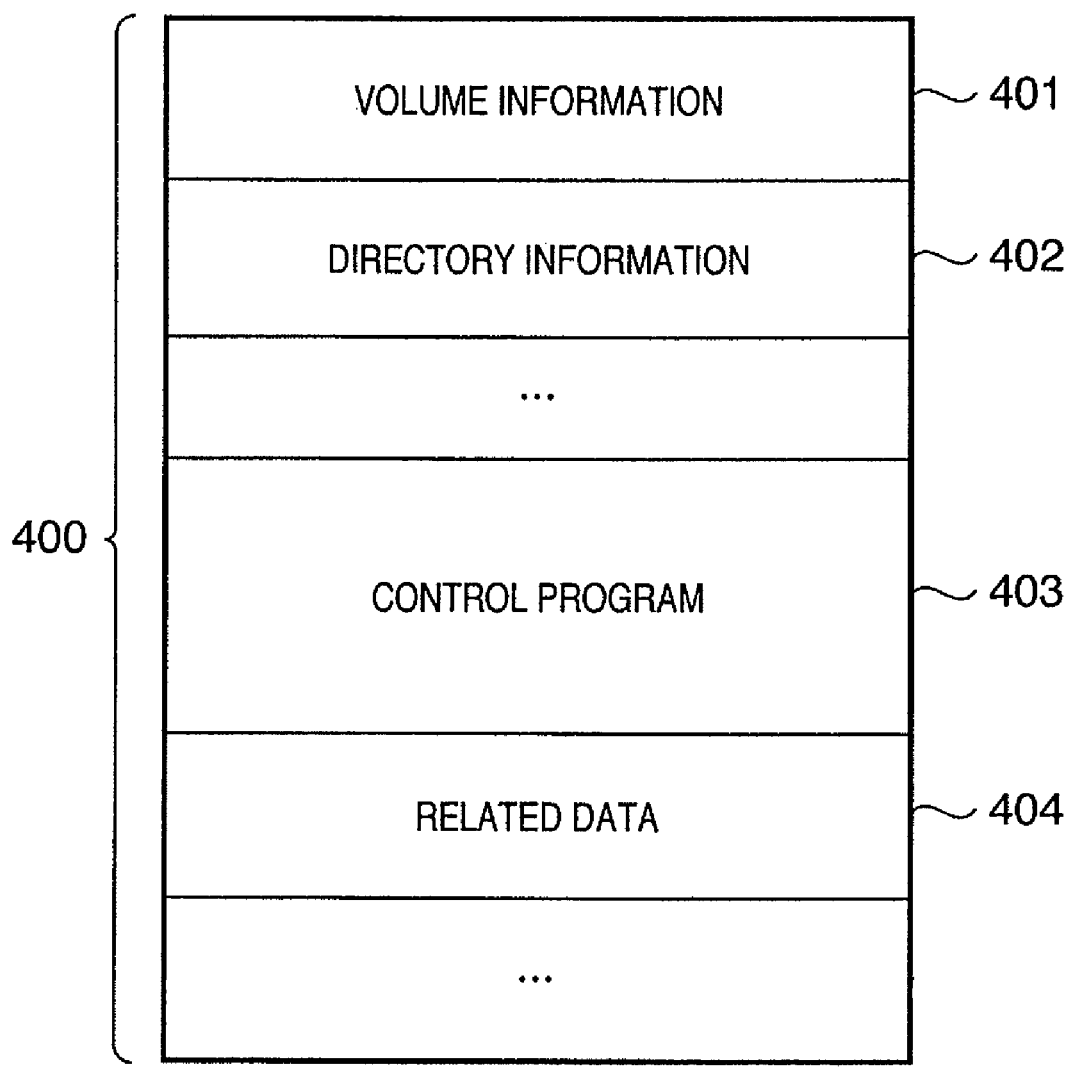
FIG. 4 is a view showing an example of the memory map on an FD according to the first embodiment of the present invention.

FIG. 4 shows an example of the memory map on the FD according to the first embodiment of the present invention.

In a memory map 400 shown in FIG. 4, reference numeral 401 denotes volume information indicating information of data; 402, directory information; 403, a control program of the client computer to be described in this embodiment; and 404, related data of the control program. Note that the control program 403 is a program required to implement the flowchart of the client computer to be described in this embodiment.

FIG. 5 shows the relationship with the FD 204 to be inserted into the FD drive-203 shown in FIG. 2. The same reference numerals in FIG. 4 denote the same parts as in FIG. 2. Referring to FIG. 5, the FD 204 stores the control program and related data of the client computer to be described in this embodiment.

<Example of Functional Arrangement of Client Computer>

Figure 6A:
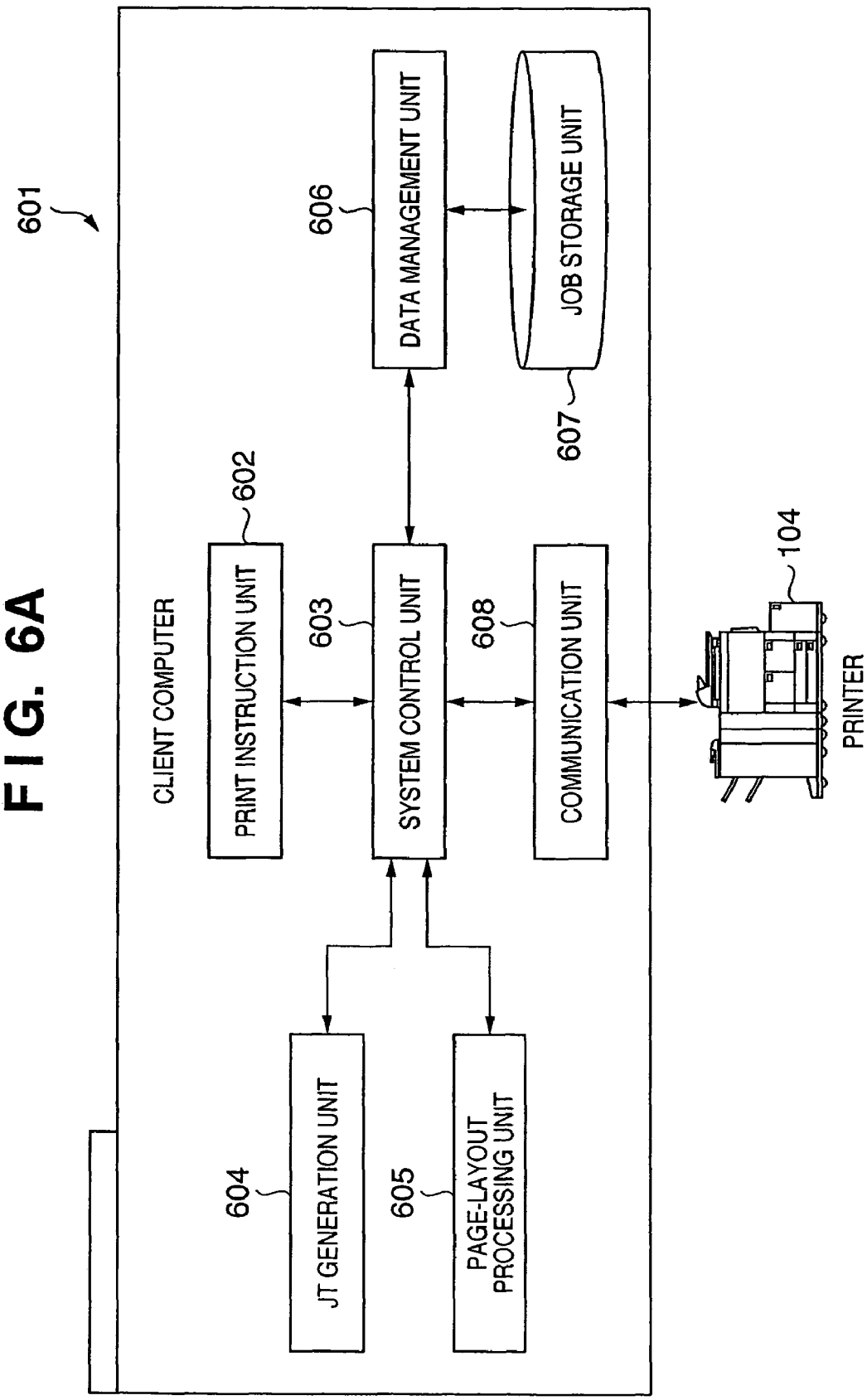
FIG. 6A is a block diagram showing the functional arrangement of the client computer according to the first embodiment of the present invention.

FIG. 6A is a block diagram showing the functional arrangement of the client computer according to the first embodiment of the present invention.

Referring to FIG. 6A, reference numeral 601 denotes a client computer (corresponding to 101 to 103 in FIG. 1) which generates a print job and transmits it to the printer 104 in response to a print instruction from the user. The client computer 601 also has, e.g., a function of re-generating a print job and re-sending it to the printer 104 in response to a modification notification from the printer 104.

Note that the processing between the client computer 601 and printer 104 will be exemplified below. Also, the same processing is executed between the client computer 601 and printer 105, as a matter of course.

Reference numeral 602 denotes a print instruction unit which issues a print instruction based on user operations on a user interface (print setting window) shown in, e.g., FIG. 6B. The print instruction unit 602 sets print properties such as print data, an output destination printer and print method, the number of copies to be printed, page range, and the like.

Reference numeral 603 denotes a system control unit which issues processing instructions and the like to respective modules (functional building components) in the client computer 601 and controls the operation of the overall client computer 601. Reference numeral 604 denotes a job ticket (JT) generation unit which generates a job ticket (print control information), which can be interpreted by the printer 104, based on the print properties set by the print instruction unit 602. Note that the job ticket is print control information which describes print settings used upon printing document data, and describes respective print setting values set on FIG. 6B.

Reference numeral 605 denotes a page-layout processing unit which executes page-layout processing for print data designated by-the print instruction unit 602 using some print properties (e.g., page layout) set by the print instruction unit 602.

Reference numeral 606 denotes a data management unit which saves a print job in a job storage unit 607 (to be described below) and performs management such as retrieval, fetch, and the like of saved print jobs.

Reference numeral 607 denotes a job storage unit which saves print jobs including print data and job tickets before the page-layout processing. Reference numeral 608 denotes a communication unit which transmits a print job from the client computer 601 to the printer 104 via the network 106 and receives a job ticket from the printer 104.

<User Interface of Client>

The configuration of a print setting window as an operation window implemented by the print instruction unit 602 will be described below using FIG. 6B.

FIG. 6B shows an example of the print setting window displayed by the client computer according to the first embodiment of the present invention.

A print setting window 1200 shown in FIG. 6B is a user interface which is displayed by the print instruction unit 602 and is used when the user issues a print instruction by designating print properties at the client computer 601. This print setting window 1200 is provided by an application or printer driver.

On the print setting window 1200, reference numeral 1201a denotes a control used to designate print data to be printed. The print data can also be designated by displaying a list of data managed in the client computer by operating a browse button 1201b and selecting desired print data.

Reference numeral 1202 denotes a control used to designate a printer as a print destination of print data. In this embodiment, this control is configured as a pull-down menu, and allows the user to designate a desired one of printers which are registered in advance in the pull-down menu.

Reference numeral 1203 denotes a control used to designate an output method of print data. In this embodiment, this control is configured as a pull-down menu, and allows the user to designate a desired one of output methods which are registered in advance in the pull-down menu. As the output methods, various output methods such as "trial print", "normal print", "double-sided print", "quick print", "high-quality print", and the like are available.

Reference numeral 1204 denotes a control used to designate the number of copies to be printed. This control is configured as an input field, and the user can input a desired numerical value to this input field using the keyboard 206 and a pointing device (not shown).

Reference numeral 1205 denotes a control used to designate a print range. This control is configured as radio buttons, and an item ("all") used to print all pages in print data and an item ("designate pages") used to print a desired page or a page group within the desired range are prepared as its items. Especially, upon selecting "designate pages", the user inputs a desired page number or the start and end page numbers of the desired range in the prepared input field.

Reference numeral 1206 denotes a control used to designate a page layout. This control is configured as a pull-down menu, and allows the user to designate a desired one of N-up print modes which are registered in advance in the pull-down menu. Note that "N-up" is to lay out and print documents for N pages (N pages or more (N-up)) on one print sheet. As the page layout, "2 pages/sheet (2-in-1)", "4 pages/sheet (4-in-1)", and the like are available.

Reference numeral 1207 denotes a control used to designate rotation of an image. This control is configured as a pull-down menu, and allows the user to designate a rotation angle which is registered in advance using the pull-down menu. As the rotation angles, for example, 90° rotation, 180° rotation, mirror image reversal, and the like are available.

Reference numeral 1208 denotes a print execution button. Upon operation of this button, various settings on the print setting window are set in print data as print property information, and a print instruction is issued to the printer. This print instruction includes an instruction command indicating the output method designated using the control 1203. Reference numeral 1209 denotes a cancel button. Upon operation of this button, various settings on the print setting window are canceled, and the print setting window 1200 is cleared.

Note that the print setting items on this print setting window 1200 are examples. For example, various print setting items such as a paper size and print direction (print orientation) of a print sheet, and image processing methods (edge emphasis, color adjustment, filter processing, and the like) may be included according to the use applications and purposes.

Various controls which form the print setting window 1200 are examples. Various other controls such as a dialog box, check box, list box, and the like can be used in addition to those shown in FIG. 6B.

<Example of Functional Arrangement of Printer>

FIG. 7A is a block diagram showing the functional arrangement of the printer according to the first embodiment of the present invention.

Reference numeral 701 denotes a communication unit which receives a print job including a job ticket from the client computer 601 via the network or transmits a job ticket to the client computer 601.

Reference numeral 702 denotes a printer control unit which issues processing instructions and the like to respective modules (functional building components) in the printer 104 and controls the operation of the overall printer 104. Reference numeral 703 denotes an RIP processing unit which interprets print data and executes RIP (Raster Image Processor) processing (raster image rasterization processing).

Reference numeral 704 denotes a data management unit which saves a print job which includes print data and a job ticket after the RIP processing in a job storage unit 705, and performs management such as retrieval, fetch, replacement, and the like of print jobs saved in the job storage unit 705. Reference numeral 705 denotes a job storage unit which saves print jobs including print data and job tickets after the RIP processing.

Reference numeral 706 denotes a print processing unit which generates image data by applying image processing (e.g., zooming, color appearance adjustment processing, and the like) to the print data after the RIP processing, and sequentially executes print processing on print sheets. Reference numeral 707 denotes an operation unit which issues a print instruction based on user operations on a user interface (print property setting window) shown in, e.g., FIG. 7B. As will be described later, the user selects a print job saved in the job storage unit 705, sets print properties, and then can issue a re-print instruction by a "print execution" button via this print property setting window.

Note that the operation unit 707 also has, as setting items of print properties, items such as a page layout, image rotation, and the like, which can be processed by only the client computer 601, in addition to the items such as the number of copies, print ranges, and the like, which can directly undergo print processing by the printer 104. The operation unit 707 is normally implemented by a display unit and input unit, which include a liquid crystal panel, LEDs, physical buttons (a numerical keypad and arrow keys), a touch panel, and the like.

Reference numeral 708 denotes a job ticket (JT) generation unit which generates a job ticket based on the print properties set using the operation unit 707.

<User Interface of Printer>

The configuration of the print property setting window as an operation window implemented by the operation unit 707 will be described below using FIG. 7B.

Figure 7B:
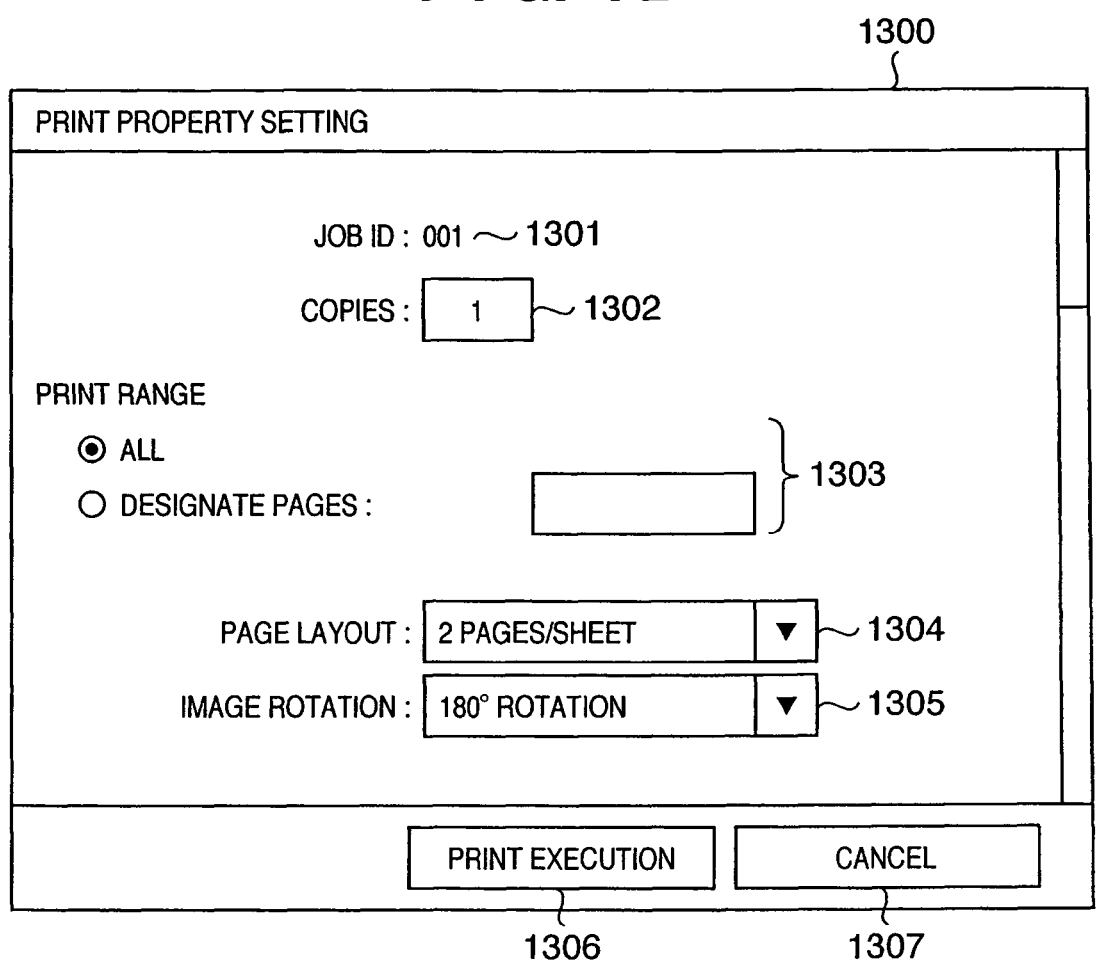
FIG. 7B is a view showing an example of a print property setting window displayed by the printer according to the first embodiment of the present invention.

FIG. 7B shows an example of the print property setting window displayed by the printer according to the first embodiment of the present invention.

A print property setting window 1300 shown in FIG. 7B is a user interface which is displayed by the operation unit 707 when the user designates print properties-of a desired print job and issues a print instruction.

Note that the print property items that can be set on the print property setting window 1300 includes both those which can be modified only by the client computer 601 and those which can be modified by the printer 104.

Note that the items which can be modified by only the client computer 601 include print property items that the printer 104 does not have their modification functions. For example, such items .correspond to a page layout setting item 1304 and an image rotation setting item 1305 executed by the page-layout processing unit 605 of the client computer 601.

On the print property setting window 1300, reference numeral 1301 denotes a control used to display a job ID indicating the print job to be processed. The print job to be processed can be designated by calling a job list window (not shown) indicating a list of print jobs which are waiting for processing by the printer 104, and selecting a desired print job from that job list window.

Reference numeral 1302 denotes a control used to designate the number of copies to be printed. This control is configured as an input field, and the user can input a desired numerical value to this input field using the operation unit 707.

Reference numeral 1303 denotes a control used to designate a print range. This control is configured as radio buttons, and an item ("all") used to print all pages in print data and an item ("designate pages") used to print a desired page or a page group within the desired range are prepared as its items. Especially, upon selecting "designate pages", the user inputs a desired page number or the start and end page numbers of the desired range in the prepared input field.

Reference numeral 1304 denotes a control used to designate a page layout. This control is configured as a pull-down menu, and allows the user to designate an N-up print mode which is registered in advance using the pull-down menu. Reference numeral 1305 denotes a control used to designate rotation of an image. This control is configured as a pull-down menu, and allows the user to designate a rotation angle which is registered in advance using the pull-down-menu.

Reference numeral 1306 denotes a print execution button. Upon operation of this button, various settings on the print property setting window are set in print data as print property information, and a print instruction is issued. If the set print property information includes items which cannot be modified in the printer 104, that print property information is transmitted to the client computer 601 together with its print data to request the client computer 601 to modify the print properties. After that, the modified print data is received from the client computer 601, and is printed.

Reference numeral 1307 denotes a cancel button. Upon operation of this button, various settings on the print property setting window are canceled, and the print property setting window is cleared.

As can be seen from comparison between the print setting window 1200 (FIG. 6B) implemented on the client computer 601 and the print property setting window 1300 (FIG. 7B) implemented on the printer 104, these windows include some common print property items.

Note that the setting operations of the print property items prepared on the print property setting window 1300 of the printer 104 are accepted, but modification of print properties according to the setting contents cannot be implemented on the printer 104 depending on the types of print property items. For this reason, in such case, a modification request of the print of the print properties according to the setting contents is sent to the client computer 601.

In this way, the printer 104 also accepts modification operations (setting operations) of print property items which cannot be modified by itself, and requests the client computer 601 to execute that modification processing itself. In this manner, when the user wants to modify a given print property of print data upon re-printing that data and that modification contents cannot be modified on the printer 140 side, he or she need only make a modification operation on the printer 104 to complete target processing.

That is, the user is released from the need to move from the location of the printer 104 to that of the client computer 601 and to execute the modification operation on the client computer 601. In this manner, the operation load associated with the modification job on the user can be reduced.

<Example of Job Ticket>

Figure 8:
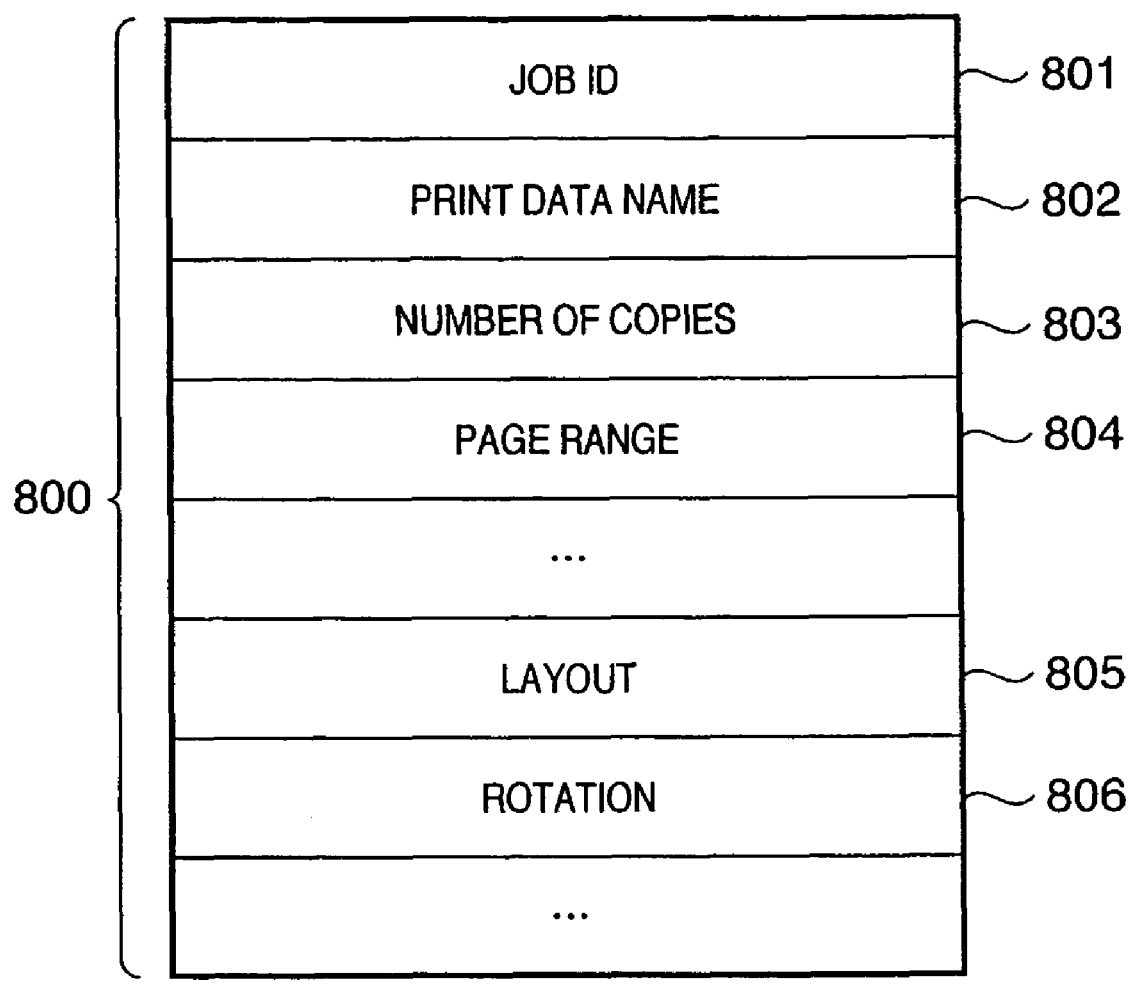
FIG. 8 is a view showing an example of a job ticket according to the first embodiment of the present invention.

FIG. 8 shows an example of a job ticket according to the first embodiment of the present invention.

Note that a job ticket 800 shown in FIG. 8 is generated by the JT generation unit 604 of the client computer 601 or the JT generation unit 708 of the printer 104.

In the job ticket 800, reference numeral 801 denotes a field that stores a job ID required to uniquely identify a job by the client computer 601 and printer 104. Reference numeral 802 denotes a field that stores a print data name indicating the name of print data. Reference numerals 803, 804, . . . , 805, and 806 denote fields that respectively store print property information including the number of copies, page range, layout, rotation, and the like.

<Processing Sequence of Printing System>

Figure 9:
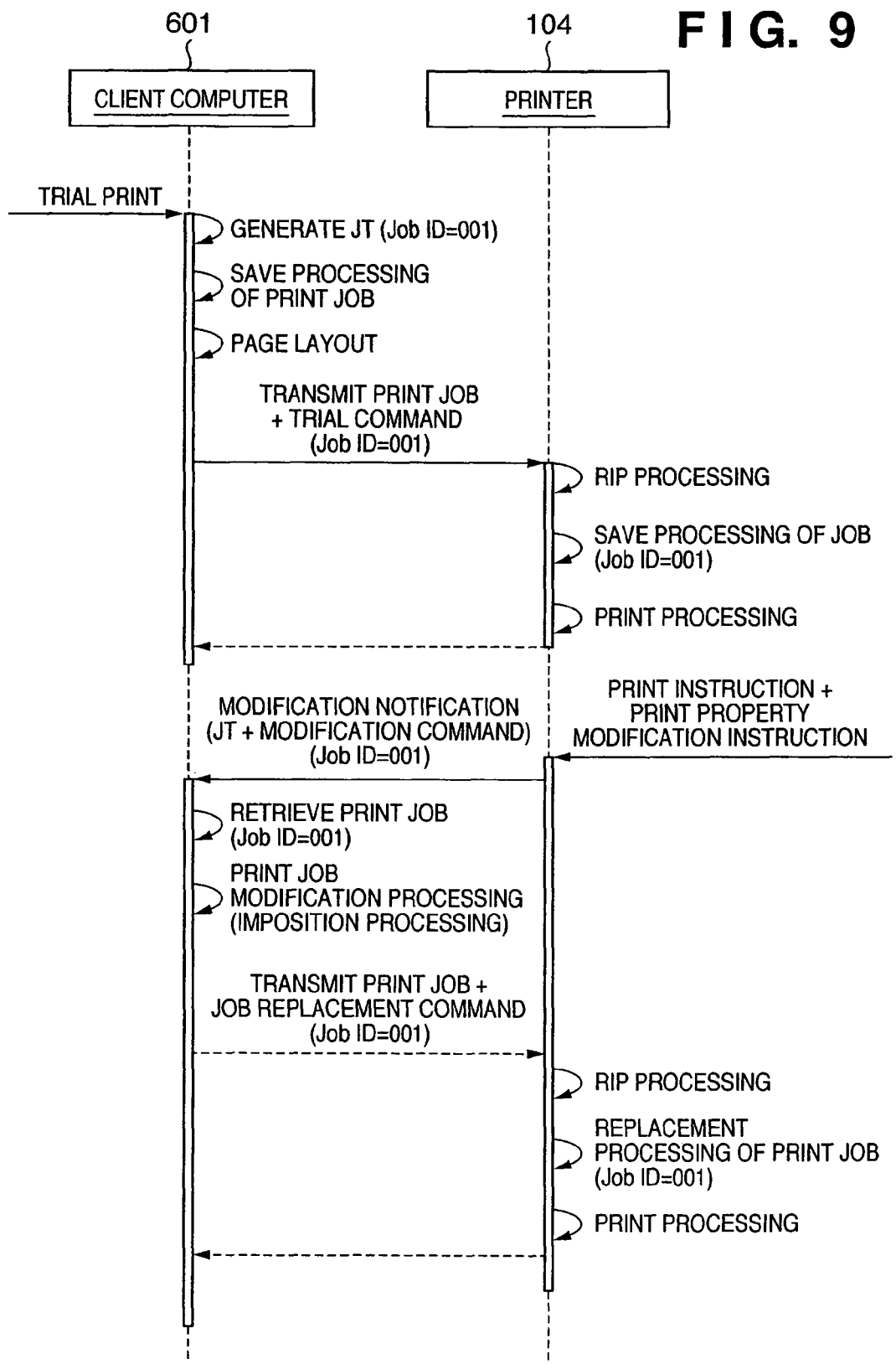
FIG. 9 is a chart showing the processing sequence of the printing system according to the first embodiment of the present invention.

FIG. 9 is a chart showing the processing sequence of the printing system according to the first embodiment of the present invention.

Note that FIG. 9 will explain the processing sequence of the trial print processing which is implemented between the client computer 601 and printer 104. This processing is implemented by the system control unit 603 which is implemented by the CPU 200 and the like according to the control program.

When the user inputs a trial print instruction to the client computer 601, the client computer 601 generates a job ticket (JT) 800, and saves a print job (print data+job ticket) in the job storage unit 607. After that, the client computer 601 executes the page-layout processing, and transmits the print job (print data after the page-layout processing+job ticket) and a trial print command to the printer 104.

Upon reception of the print job and trial print command from the client computer 601, the printer 104 executes the RIP processing, and saves the print job in the job storage unit 704, thus executing print processing.

When the user confirms the print result and inputs a print instruction by modifying print properties using the operation unit 707 of the printer 104, the printer 104 checks if the modification item requires processing in the client computer 601. As a result of checking, if modification processing in the client computer 601 is required, the printer 104 transmits a modification notification (modification command+job ticket) to the client computer 601.

Upon reception of the modification notification from the printer 104, the client computer 601 retrieves the print job to be modified from the job storage unit 607, and applies the page-layout processing to the retrieved print job to modify that print job. The client computer 601 then transmits the modified print job (modified print data+job ticket) and a job replacement command to the printer 104.

Upon reception of the print job and job replacement command from the client computer 601, the printer 104 executes the RIP processing, and replaces the print job in the job storage unit 705 by the received modified print job, thus executing print processing.

<Processing Flow of Client Computer>

Figure 10:
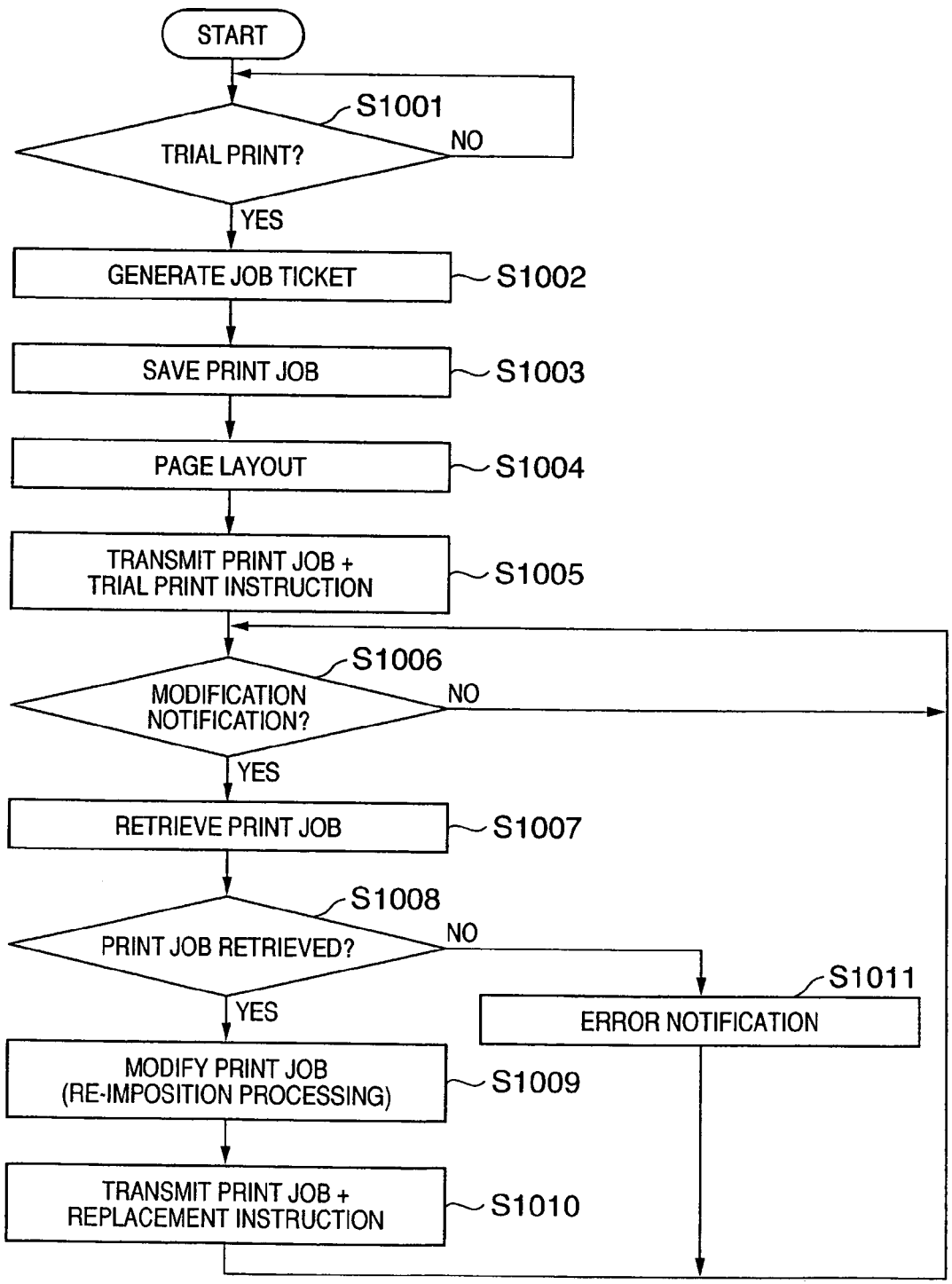
FIG. 10 is a flowchart showing the processing flow to be executed by the client computer according to the first embodiment of the present invention.

FIG. 10 is a flowchart showing the processing flow to be executed by the client computer according to the first embodiment of the present invention.

Note that FIG. 10 will explain the flow of the processing for transmitting a print job to the printer 104 after a trial print is executed at the client computer 601, re-generating a print job in response to a modification notification from the printer 104, and re-transmitting it to the printer 104. This processing is implemented by the printer control unit 702 which is implemented by a printer CPU (not shown) and the like according to the control program.

The system control unit 603 checks in step S1001 if a trial print instruction is input from the print instruction unit 602. If the trial print instruction is input (YES in step S1001), the flow advances to step S1002. On the other hand, if no trial print instruction is input (NO in step S1001), the control stands by until an instruction is input.

Note that this embodiment executes the following processing when a trial print instruction is input. However, the present invention is not limited to this. For example, the same applies to designation of proof print, and the following processing is executed when a predetermined print method is instructed. For the sake of simplicity, loop processing is executed when no trial print instruction is input. However, in practice, when a normal print method is designated, a print job including a job ticket is generated and is transmitted to the printer.

In step S1002, the system control unit 603 instructs the JT generation unit 604 to generate a job ticket. In response to this instruction, the JT generation unit 604 generates a job ticket shown in FIG. 8 using the print setting values set on the print setting window 1200 shown in FIG. 6B. In this case, a job ID is assigned to that job ticket. Assume that "001" is assigned as the job ID in this case.

In step S1003, the system control unit 603 generates a print job which includes print data designated by the print instruction unit 603, and the job ticket generated in step S1002. Then, the system control unit 603 instructs the data management unit 606 to save that print job. In response to that instruction, the data management unit 606 saves the print job (job ID="001") in the job storage unit 607 (saves the print job before the page-layout processing).

Note that the print job to be saved at that time includes the job ticket and print data before the page-layout processing by the page-layout processing unit 605. The print data is data of a predetermined format converted from rendering data output from an arbitrary application, and may have an intermediate data format, PDF format, or page description language format.

In step S1004, the system control unit 603 instructs the page-layout processing unit 605 to execute page-layout processing of the print job (job ID="001"). In response to this instruction, the page-layout processing unit 605 executes the page-layout processing of the print job.

In step S1005, the communication unit 608 transmits the print job (print data after the page-layout processing+job ticket) that has undergone the page-layout processing in step S1004 to the printer 104 together with a trial print command.

The communication unit 608 checks in step S1006 if a modification notification (modification command+job ticket) of the print job is received from the printer 104. If the modification notification is received (YES in step S1006), the flow advances to step S1007. On the other hand, if no modification notification is received (NO in step S1006), the control waits until a modification notification is received.

Assume that a modification notification detection module is running on the client computer 601 as a resident application, and is configured to be able to execute the following processing upon reception of the modification notification from the printer. Since the resident application of a state-of-the-art technique, a description thereof will be omitted.

If it is determined in step S1006 that no modification notification is received within a predetermined period of time after transmission of the print job, it is determined that no modification request is returned, and the processing may end or the control advances to the next processing. In addition, in order to save the storage capacity of the job storage unit 607, that print job may be deleted from the job storage unit 607.

In step S1007, the system control unit 603 acquires the job ID of a job ticket included in the received modification notification. In this case, assume that job ID="001". The system control unit 603 then instructs the data management unit 606 to retrieve a print job corresponding to the acquired job ID ("001"). In response to this instruction, the data management unit 606 retrieves the print job (job ID="001") from the job storage unit 607.

It is checked in step S1008 if the print job is retrieved. If the print job is retrieved (YES in step S1008), the flow advances to step S1009. On the other hand, if no print job is retrieved (NO in step S1006), the flow advances to step S1011.

In step S1009, the system control unit 603 acquires the print data before the page-layout processing of the retrieved print job (job ID="001") based on the settings (modification settings) of the job ticket received from the printer 104. The system control unit 603 instructs the page-layout processing unit 605 to execute the page-layout processing of the acquired print data using the job ticket for modification included in the modification notification.

In response to this instruction, the page-layout processing unit 605 executes the page-layout processing. In this embodiment, the job ticket for modification which is included in the modification notification and describes the modification contents is received from the printer 104. When this job ticket for modification does not include all print setting values required to generate a print job, insufficient print setting values are compensated using the job ticket stored in the job storage unit 607, thus generating the print job.

In step S1010, the communication unit 608 transmits the print job (print data+job ticket) after the page-layout processing to the printer 104 together with a job replacement command. After transmission of the print job, the flow returns to step S1006.

Note that the job replacement command is not always required. However, upon reception of this job replacement command, the printer 104 deletes the print job saved previously, and saves a newly received print job. Of course, using the same job ID as that upon trial printing without any job replacement command, the print job to be replaced may be determined in the printer 104.

On the other hand, if no print job is retrieved (NO in step S1008), the communication unit 608 sends error information indicating that no print job (job ID="001") to be modified based on the modification notification is retrieved to the printer 104 in step S1011. After the error information is sent, the flow returns to step S1006.

<Processing Flow of Printer>

Figure 11:
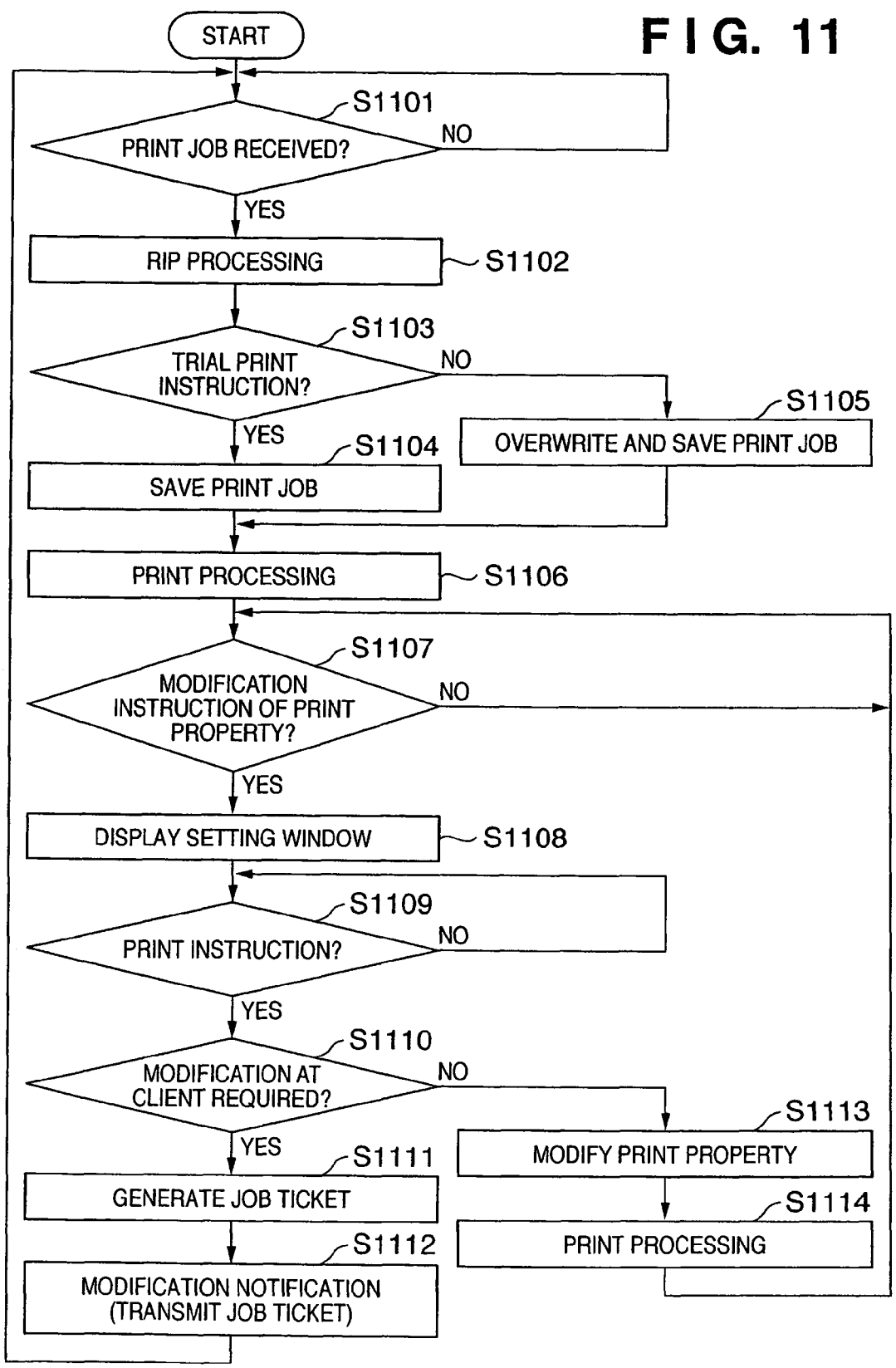
FIG. 11 is a flowchart showing the processing flow to be executed by the printer according to the first embodiment of the present invention.

FIG. 11 is a flowchart showing the processing flow to be executed by the printer according to the first embodiment of the present invention.

Especially, FIG. 11 will explain the flow of processing for executing print processing based on a print job received from the client computer 601, and executing print processing based on print properties set again by the user or sending a modification notification to the client computer in the printer 104.

The communication unit 701 checks in step S1101 if a print job (print data+job ticket (job ID="001")) from the client computer 601. If the print job is received (YES in step S1101), the flow advances to step S1003. If no print job is received (NO in step S1101), the control waits until a print job is received.

In step S1102, the printer control unit 702 instructs the RIP processing unit 703 to execute RIP processing of the received print job. The RIP processing unit 703 executes the RIP processing of the received print job in response to this instruction.

The printer control unit 702 checks in step S1103 if the command received from the client computer 601 is a trial print command as a predetermined command. If the received command is a trial print command (YES in step S1103), the flow advances to step S1104. If the received command is not a trial print command (NO in step S1103), and if the received command is a job replacement command in this case, the flow advances to step S1105.

In step S1104, the printer control unit 702 instructs the data management unit 704 to save the print job that has undergone the RIP processing in step S1102. In response to this instruction, the data management unit 704 saves the print job (job ID="001") that has undergone the RIP processing in the job storage unit 705.

On the other hand, if the received command is a job replacement command (NO in step S1103), the printer control unit 702 instructs, in step S1105, the data management unit 704 to replace the print job that has undergone the RIP processing in step S1102. The data management unit 704 replaces the print job (job ID="001") already saved in the job storage unit 705 by the print job (job ID="001") that has undergone the RIP processing in response to this instruction.

Note that this embodiment will explain processing of a print job appended with a trial print command and that with a job replacement command for the sake of simplicity. However, a normal print job can also be processed. In case of a normal print job, the print processing in next step S1106 is executed, thus ending the processing.

In step S1106, the printer control unit 702 instructs the print processing unit 706 to execute print processing of the received print job. As described above, in response to this instruction, the print processing unit 706 generates bitmap data from the print data based on the print setting value described in the job ticket, and executes the print processing.

The printer control unit 702 checks based on user operations at the operation unit 707 in step S1107 if a modification instruction of print properties is input. If the modification instruction is input (YES in step S1107), the flow advances to step S1108. On the other hand, if no modification instruction is input (NO in step S1107), the control waits until a modification instruction is input.

If it is determined in step S1107 that no modification instruction is received within a predetermined period of time after execution of the print processing, it is determined that no modification instruction is input, and the processing may end or the control advances to the next processing. In addition, in order to save the storage capacity of the job. storage unit 705, that print job may be deleted from the job storage unit 705.

In step S1108, the operation unit 707 displays the user interface (print property setting window) shown in FIG. 7B.

In the description of this embodiment, the print property setting window 1300 in FIG. 7B is displayed in response to operations on the operation unit 707 in step S1107. However, the present invention is not limited to this. For example, after the print processing of a print job with a trial print command, the print property setting window may be automatically displayed.

The printer control unit 702 checks based on user operations on the print property setting window 1300 in step S1109 if a print instruction is input. If the print instruction is input (YES in step S1109), the flow advances to step S1110. On the other hand, if no print instruction is input (NO in step S1109), the control waits until a print instruction is input.

Note that the checking processing in step S1109 is implemented when the operation unit 707 determines the presence/absence of pressing of the print execution button 1306 on the print property setting window 1300 (FIG. 7B).

The printer control unit 702 checks in step S1110 if the modification item of a print property set using the operation unit 707 includes that which can be modified only by the client computer 601. If the set modification item includes that which can be modified only by the client (YES in step S1110), the flow advances to step S1111.

On the other hand, if the set modification item does not include any modification item which can be modified by only the client (NO in step S1110), i.e., if the medication item includes only that which can be modified by the printer 104, the flow advances to step S1113.

Note that the checking processing in step S1110 is implemented by, e.g., referring to a modification availability table managed by the data management unit 704. This modification availability table manages a flag indicating whether or not each of print property items that can be set on the print property setting window 1300 in FIG. 7B can be modified by only the client computer 601.

As another method, the print control program itself may have a routine for determining if a predetermined print setting item has been changed, and it may be individually checked if a modification in the client is required. However, in order to provide expandability of print setting items, higher efficiency is assured when the modification availability table is used.

Note that the print property item which can be modified by only the client computer 601 includes page layout (1304 in FIG. 7B) and image rotation 1305 in FIG. 7B). In other words, a print property item that requires the page-layout processing by the page-layout processing unit 605 of the client computer 601 normally corresponds to that which can be modified by only the client computer 601. This is because the printer 104 normally does not have advanced processing performance that can implement the page-layout processing.

The setting contents of print property items on the print property setting window 1300 may include a print property item which can be modified only by the client computer 601 and that which can be modified by the printer together depending on change contents. In this case, basically, since a modification item which can be modified only by the client is included, the flow advances to step S1111.

The description will revert to FIG. 11.

If the modification item which can be modified only by the client is included (YES in step S1110), the printer control unit 702 instructs the JT generation unit 708 to generate a job ticket including print properties set (modified) using the operation unit 707 in step S1111. The JT generation unit 708 generates a job ticket shown in FIG. 8 (job ID="001").

The job ticket generated in this step includes print setting values input via the print property setting window 1300 in FIG. 7B, but print setting items described in the job ticket often include items which are generally not displayed.

For this reason, the JT generation unit 708 desirably generates a job ticket by complementing insufficient print setting items from the values of the print setting items in the job ticket stored in the job storage unit 705. However, even the job ticket with insufficient print setting values can be complemented by the client 601, as described above. Hence, the present invention can be implemented even when the job ticket is complemented by either the printer or client.

In step S1112, the communication unit 701 transmits a modification notification including the generated job ticket for modification, the job ID, and a modification command to the client computer 601. After the transmission, the flow returns to step S1101.

On the other hand, if only a modification item which can be modified by the printer 104 is included (NO in step S1110), the printer control unit 702 modifies the print property of the print job saved in the job storage unit 705 in step S1113. In step S1114, the print processing unit 706 executes print processing of the print job whose print property is modified. After the print processing, the flow-returns to step S1107.

As described above, according to the first embodiment, when print processing in a predetermined print (trial print) mode is to be executed, print data is saved beforehand in the client computer. After the predetermined print (trial print) processing, if it is determined that a change in print setting made on the printing apparatus requires a modification in the client computer, the printing apparatus sends a modification request to the client computer. In this case, the client computer modifies the print data saved beforehand in accordance with the modification contents indicated by the modification request, and re-sends it to the printing apparatus. Then, the printing apparatus can execute print processing based on the received print data.

In this way, the user can execute modified print processing whose setting is changed on the printer without going to the client computer, thus improving user's convenience.

In the first embodiment, upon executing print processing in the predetermined print (trial print) mode, print data is saved in advance in the client computer. However, the present invention is not limited to this. For example, upon executing print processing, the client computer may save print data in advance irrespective of a print method (print mode), although it depends on a limitation on the storage capacity of the job storage unit 607.

That is, in the print workflow, since the user works on the printer side, high work efficiency is assured because a modification instruction can be input on the operation unit of the printer. If the modification contents can be modified inside the printer, the print job held in the printer can be modified and re-printed, thus speeding up the processing. On the other hand, if the modification contents cannot be modified inside the printer, a modification notification is sent to the client, and the client re-sends a print job. Hence, re-print processing can be done in response to an instruction on the printer irrespective of the modification contents.

That is, since the user is more likely to desire to change the print settings of print data which has been printed once even in case of print methods other than the trial print method, it is effective to give a chance of changing the print settings irrespective of the print mode depending on the use applications or purposes.

Second Embodiment

In the first embodiment, when the print instruction unit 602 issues a trial print instruction based on print properties designated by the user on the client computer 601, the printer 104 executes trial print processing. When the user modifies print properties and inputs a print instruction using the operation unit 707 of the printer 104, the client computer 601 re-generates (modifies) a print job as needed and transmits it to the printer 104, thus executing print processing.

However, the following configuration may be adopted. That is, at the trial print instruction timing on the client computer 601, a print property pattern which specifies a combination of a plurality of print property items that are assumed in advance may be instructed from the print instruction unit 602.

Figure 12:
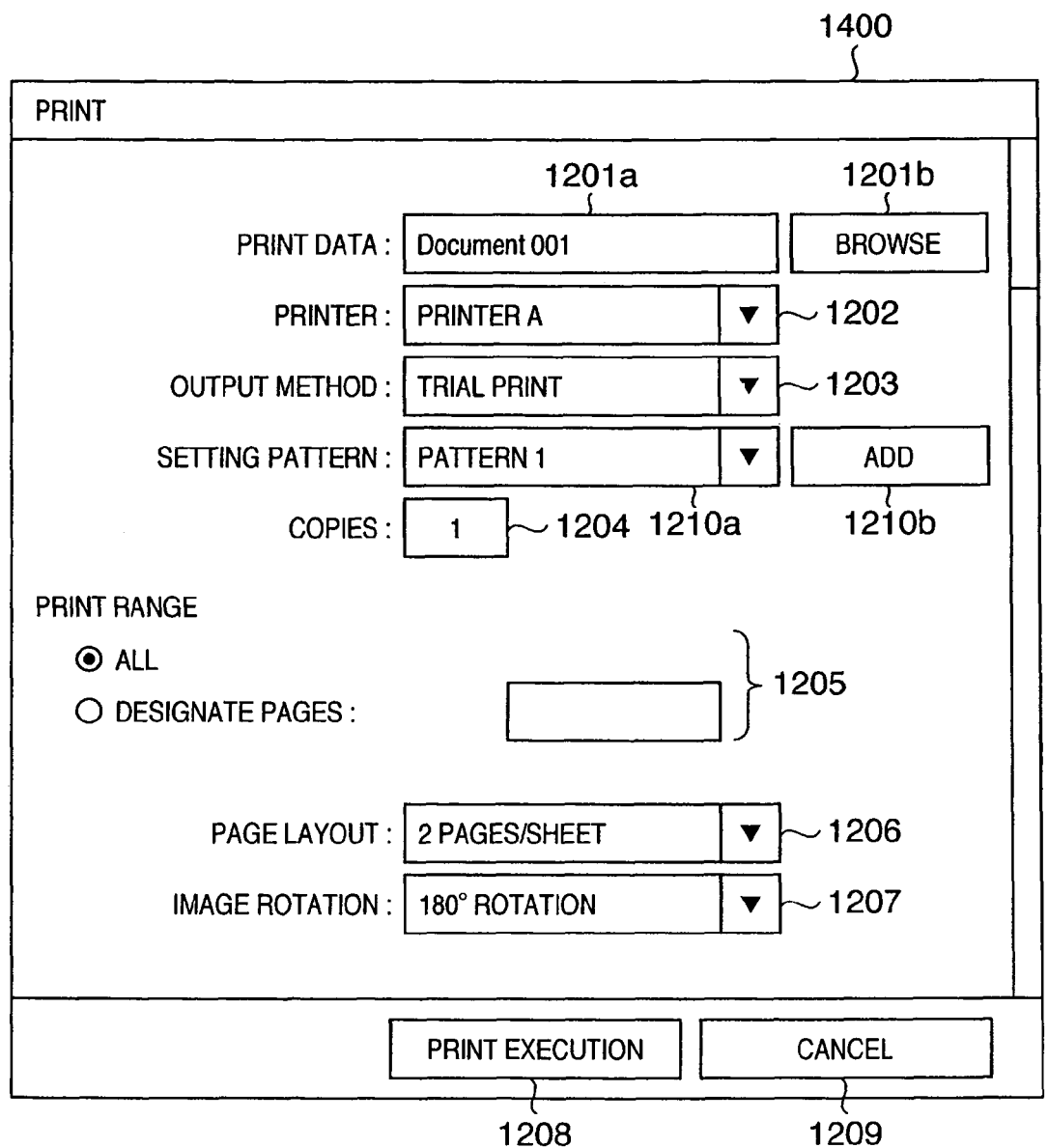
FIG. 12 is a view showing an example of a print setting window according to the second embodiment of the present invention.

This configuration is implemented using, e.g., a print setting window shown in FIG. 12.

FIG. 12 shows an example of the print setting window according to the second embodiment of the present invention.

Note that the same reference numerals on a print setting window 1400 shown in FIG. 12 denote the same building components as those on the print setting window in FIG. 6B of the first embodiment, and a detailed description thereof will be omitted.

On the print setting window 1400 of the second embodiment, a control 1210*a* used to select a setting pattern is added to the print setting window 1200 of the first embodiment. This control is configured as a pull-down menu, and allows the user to select an arbitrary one of various setting patterns as combinations of a plurality of print property items, which are registered in advance in the pull-down menu.

When the user selects a given setting pattern, the setting values of respective print property items set in that setting pattern are set in the corresponding controls. For example, in FIG. 12, when a pattern with a pattern name "pattern 1" is selected, setting values shown in FIG. 12 are set in respective print property items 1202 to 1207 in correspondence with print data ("Document001").

This setting pattern is formed as a file. In this case, by accessing the storage location of that file by operating an add button 1210b, an arbitrary setting pattern can be newly added to the control 1210a.

When a print execution button 1208 is operated, a job ticket which includes the setting values of respective print property items specified by another setting pattern in addition to those of respective print property items specified by the currently set setting pattern is generated.

Figure 13:
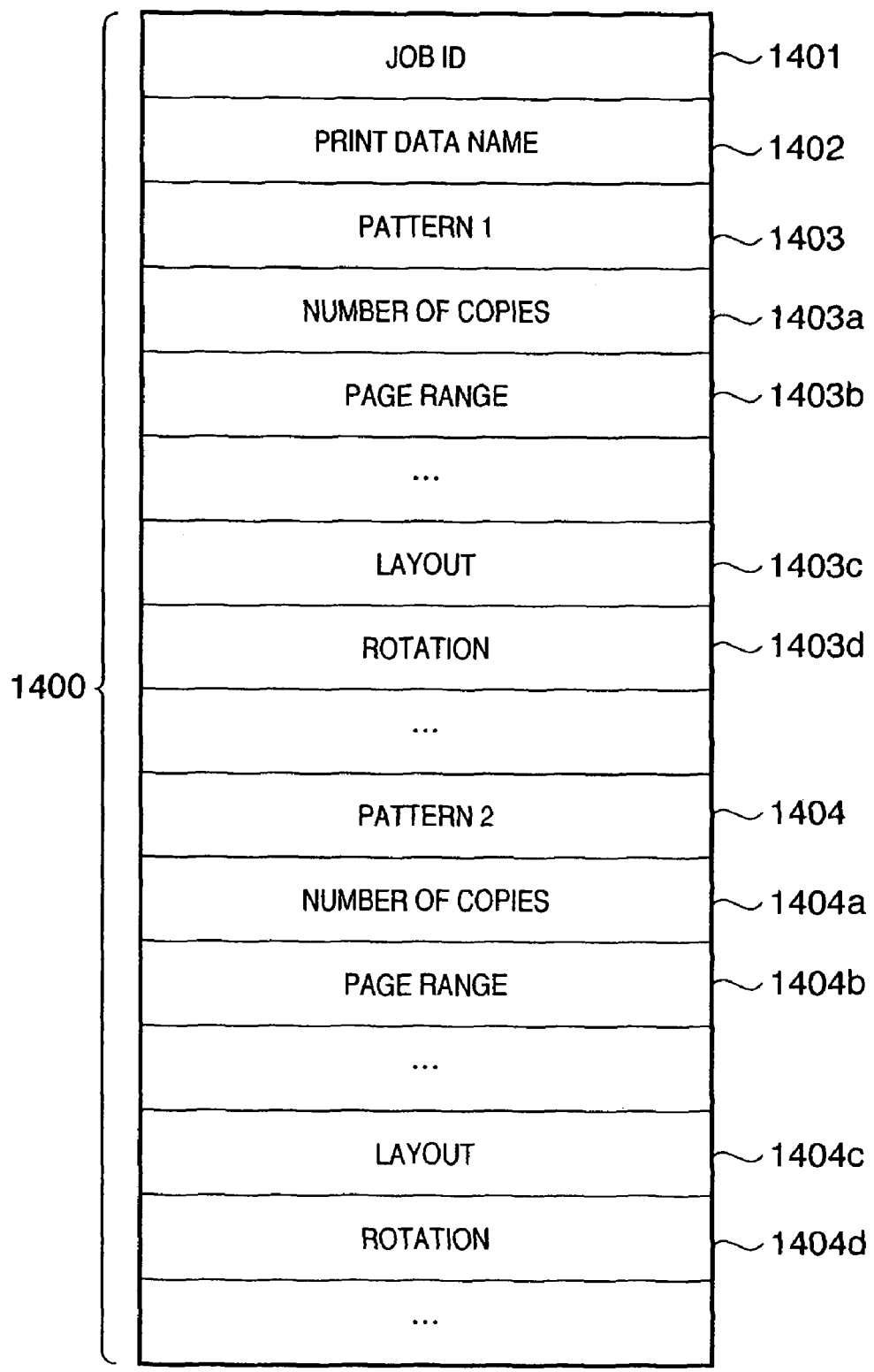
FIG. 13 is a view showing an example of a job ticket according to the second embodiment of the present invention.

FIG. 13 shows an example of this job ticket.

FIG. 13 is a view showing an example of a job ticket according to the second embodiment of the present invention.

In a job ticket 1400, reference numeral 1401 denotes a field that stores a job ID required to uniquely identify a job by the client computer 601 and printer 104. Reference numeral 1402 denotes a field that stores a print data name indicating the name of print data. Reference numerals 1403 and 1404 denote fields that store setting pattern names indicating setting patterns. Reference numerals 1403a, 1403b, ..., 1403c, and 1403d denote fields that respectively store print property information including the number of copies, page range, layout, rotation, and the like, which are specified by the setting pattern 1403. Likewise, reference numerals 1404a, 1404b, ..., 1404c, and 1404d denote fields that respectively store print property information including the number of copies, page range, layout, rotation, and the like, which are specified by the setting pattern 1404.

The client computer 601 transmits a job ticket shown in FIG. 13 to the printer 104. When the printer 104 receives this job ticket, the operation unit 707 displays a print property setting window based on the contents of that job ticket.

An example of this print property setting window will be described below using FIG. 14.

Figure 14:
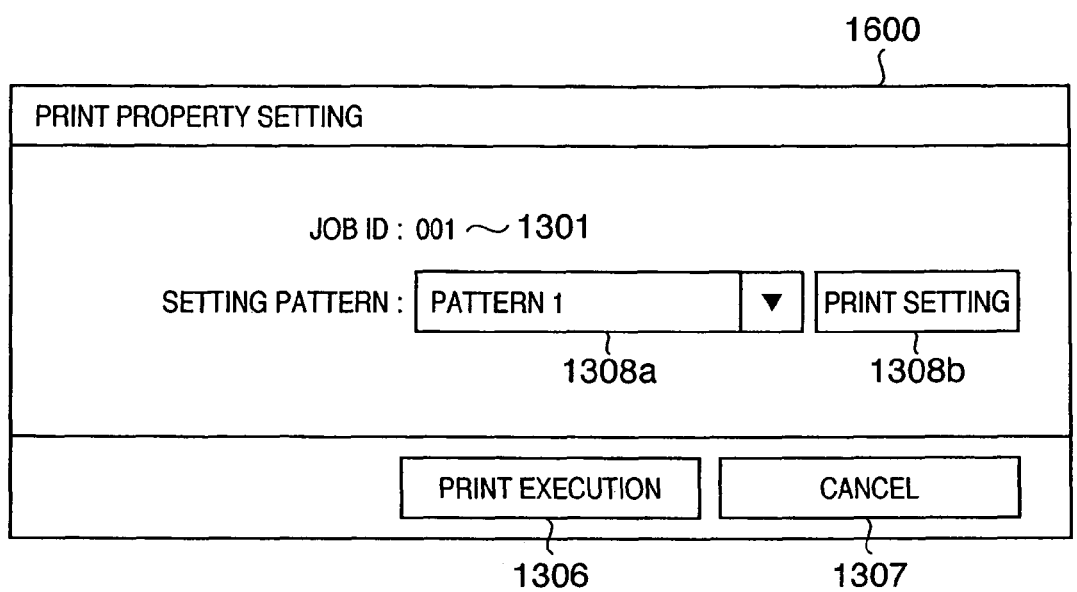
FIG. 14 is a view showing an example of a print property setting window according to the second embodiment of the present invention.

FIG. 14 is a view showing an example of the print property setting window according to the second embodiment of the present invention.

Note that the same reference numerals on a print property setting window 1600 shown in FIG. 14 denote the same building components as those on the print property setting window in FIG. 7B of the first embodiment, and a detailed description thereof will be omitted.

On the print property setting window 1600 of the second embodiment, a control 1308a used to select (change) the setting pattern is displayed in place of the print property item group displayed on the print property setting window 1300 of the first embodiment. This control is configured as a pull-down menu and allows the user to select (change) an arbitrary one of various setting patterns which are registered in advance in the pull-down menu and each of which includes a combination of a plurality print property items.

Reference numeral 1308b denotes a control used to independently change only arbitrary print property items in the setting pattern. This control is configured as a button, and upon operation of this button, a window which is compliant to the print property setting window 1300 of the first embodiment and allows the user to independently set print property items is displayed. With this window, the user can independently change only arbitrary print property items of the setting pattern.

When the setting pattern is changed on the print property setting window 1600, the determination processing in step S1110 in FIG. 11 is executed based on the setting values of respective print property items specified by that setting pattern. Based on the determination result, a modification instruction is transmitted to the client computer 601.

As described above, according to the second embodiment, the effects described in the first embodiment can be obtained.

In addition, when the setting contents of print property items are changed based on a print property pattern that specifies a combination of a plurality of print property items, print properties for print data can be modified by making operations for the printer.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2005-219440, filed Jul. 28, 2005, which is hereby incorporated by reference herein in its entirety.

What is claimed is:

1. A printing system which comprises an information processing apparatus and a printing apparatus connected to said information processing apparatus, and controls said printing apparatus to print job data transferred from said information processing apparatus, comprising:

said information processing apparatus comprises:

first storage means for storing print data and print control information;

job data transmission means for transmitting the job data to be printed, which is generated based on the print data and the print control information, to said printing apparatus;

first modification means for modifying the print data stored in said first storage means in accordance with a modification notification from said printing apparatus to generate modified job data; and modified job data transmission means for transmitting the modified job data modified by said first modification means to said printing apparatus, and said printing apparatus comprises:

second storage means for storing job data; control means for storing job data received from said information processing apparatus in said second storage means, and executing print processing of the job data;

print property modifying and setting means for modifying and setting print properties for the job data stored in said second storage means;

determination means for determining whether or not print property items modified and set by said print property modifying and setting means include items which cannot be modified by said printing apparatus but can be modified by said information processing apparatus;

notification means for transmitting a modification notification that requests to modify the job data based on the modified and set print property items to said information processing apparatus based on the determination result of said determination means; and reception means for receiving the modified job data corresponding to the modification notification from said information processing apparatus.

2. An information processing apparatus for generating job data to be printed by a printing apparatus, comprising:

storage means for storing print data and print control information;

job data transmission means for transmitting the job data to be printed, which includes the print data and the print control information, to the printing apparatus;

modification means for modifying the print data stored in said storage means in accordance with a modification notification from the printing apparatus to generate modified job data; and modified job data transmission means for transmitting the modified job data modified by said modification means to the printing apparatus.

3. The apparatus according to claim 2, wherein said storage means stores print data and print control information before page-layout processing, and said modification means generates modified job data by applying page-layout processing to the print data stored in said storage means in accordance with print control information included in the modification notification from the printing apparatus.

4. The apparatus according to claim 2, characterized by further comprising:

print setting means for making print settings including an output method of the job data, and in that said storage means stores the job data when a predetermined print mode is designated by said print setting means, and said job data transmission means transmits a command indicating the predetermined print mode to the printing apparatus together with the job data so as to make the printing apparatus save the job data after printing.

5. The apparatus according to claim 4, wherein the modified job data transmission means transmits a predetermined command to the printing apparatus together with the modified job data modified by said modification means so as to replace the job data before modification saved in the printing apparatus by the modified job data.

6. A printing apparatus for printing job data generated by an information processing apparatus, comprising:

storage means for storing job data;

control means for storing job data received from the information processing apparatus in said storage means, and executing print processing of the job data;

print property modifying and setting means for modifying and setting print properties for the job data stored in said storage means;

determination means for determining whether or not print property items modified and set by said print property modifying and setting means include items which cannot be modified by said printing apparatus but can be modified by the information processing apparatus;

notification means for transmitting a modification notification that requests to modify the job data based on the modified and set print property items to the information processing apparatus based on the determination result of said determination means; and reception means for receiving the modified job data corresponding to the modification notification from the information processing apparatus.

7. The apparatus according to claim 6, wherein when said determination means determines that the print property items modified and set by said print property modifying and setting means include items which cannot be modified by said printing apparatus but can be modified by the information processing apparatus, said notification means transmits the modification notification that requests to modify the job data based on the modified and set print property items to the information processing apparatus, and said control means executes the print processing of the modified job data received by said reception means.

8. The apparatus according to claim 6, wherein the print property modifying and setting means further comprises, when said determination means determines that the modified and set print property items do not include any items which cannot be modified by said printing apparatus but can be modified by the information processing apparatus, modifying the job data based on the modified and set print property items, and in that said control means executes the print processing of the modified job data modified by said modification means.

9. The apparatus according to claim 6, wherein when said reception means receives a command indicating the predetermined print mode together with the job data, said control means stores that job data in said storage means even after the print processing since the job data is likely to be modified and re-printed.

10. The apparatus according to claim 6, wherein when said reception means receives a predetermined command together with the modified job data, said control means replaces the job data before modification stored in said storage means by the modified job data.

11. The apparatus according to claim 6, wherein said print property modifying and setting means generates a print property setting window which allows setting a print property pattern that specifies a combination of a plurality of print property items.

12. An information processing apparatus comprising a processor and a memory storing a program executable by the processor, wherein the program includes computer code for implementing a method of generating job data to be printed by a printing apparatus, wherein the method includes the steps of:

- a storage step of storing print data and print control information in a storage medium;
- a job data transmission step of transmitting the job data to be printed, which includes the print data and the print control information, to the printing apparatus;
- a modification step of modifying the print data stored in the storage medium in accordance with a modification notification from the printing apparatus to generate modified job data; and
- a modified job data transmission step of transmitting the modified job data modified in the modification step to the printing apparatus.

13. A printing apparatus comprising a processor and a memory for storing a program executable by the processor, wherein the program includes computer code for implementing a method of printing job data generated by an information processing apparatus, wherein the method includes the steps of:

- a storage step of storing job data in a storage medium;
- a control step of storing job data received from the information processing apparatus in the storage medium, and executing print processing of the job data;
- a print property modifying and setting step of modifying and setting print properties for the job data stored in the storage medium;
- a determination step of determining whether or not print property items modified and set in the print property modifying and setting step include items which cannot be modified by the printing apparatus but can be modified by the information processing apparatus;
- a notification step of transmitting a modification notification that requests to modify the job data based on the modified and set print property items to the information processing apparatus based on the determination result in the determination step; and
- a reception step of receiving the modified job data corresponding to the modification notification from the information processing apparatus.

14. A computer-readable storage medium storing a program executable by a processor, wherein the program includes computer code for making a computer control an information processing apparatus for generating job data to be printed by a printing apparatus, the program characterized by making the computer execute:

- a storage step of storing print data and print control information in a storage medium;
- a job data transmission step of transmitting the job data to be printed, which includes the print data and the print control information, to the printing apparatus;
- a modification step of modifying the print data stored in the storage medium in accordance with a modification notification from the printing apparatus to generate modified job data; and
- a modified job data transmission step of transmitting the modified job data modified in the modification step to the printing apparatus.

15. A computer-readable storage medium storing a program executable by a processor, wherein the program includes computer code for making a computer control a printing apparatus for printing job data generated by an information processing apparatus, the program characterized by making the computer execute:

- a storage step of storing job data in a storage medium;
- a control step of storing job data received from the information processing apparatus in the storage medium, and executing print processing of the job data;
- a print property modifying and setting step of modifying and setting print properties for the job data stored in the storage medium;
- a determination step of determining whether or not print property items modified and set in the print property modifying and setting step include items which cannot be modified by the printing apparatus but can be modified by the information processing apparatus;
- a notification step of transmitting a modification notification that requests to modify the job data based on the modified and set print property items to the information processing apparatus based on the determination result in the determination step; and
- a reception step of receiving the modified job data corresponding to the modification notification from the information processing apparatus.

* * * * *